United States Patent
Bok et al.

(10) Patent No.: US 11,961,506 B2
(45) Date of Patent: *Apr. 16, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Chansik Bok, Suwon-si (KR); Jihun Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/113,284

(22) Filed: Feb. 23, 2023

(65) Prior Publication Data

US 2023/0197060 A1    Jun. 22, 2023

Related U.S. Application Data

(63) Continuation of application No. 17/528,764, filed on Nov. 17, 2021, now Pat. No. 11,615,780, which is a
(Continued)

(30) Foreign Application Priority Data

Nov. 15, 2018 (KR) .......... 10-2018-0140719

(51) Int. Cl.
*G10L 15/00* (2013.01)
*G10L 13/08* (2013.01)
(Continued)

(52) U.S. Cl.
CPC .......... *G10L 15/005* (2013.01); *G10L 13/086* (2013.01); *G10L 15/04* (2013.01);
(Continued)

(58) Field of Classification Search
CPC ....... G10L 15/005; G10L 15/04; G10L 15/22; G10L 15/26; G10L 13/086; G10L 2015/223
(Continued)

(56) References Cited

U.S. PATENT DOCUMENTS 6,983,248 B1   1/2006  Tahara et al.
8,155,956 B2   4/2012  Cho et al.
(Continued)

FOREIGN PATENT DOCUMENTS

EP    2821991        1/2015
JP    2010-009446    1/2010
(Continued)

OTHER PUBLICATIONS

Extended European Search Report, dated Apr. 21, 2016, in European Application No. 15193050.0.
(Continued)

*Primary Examiner* — Susan I McFadden
(74) *Attorney, Agent, or Firm* — STAAS & HALSEY LLP

(57) ABSTRACT

An electronic apparatus including a memory configured to store first voice recognition information related to a first language and second voice recognition information related to a second language, and a processor to obtain a first text corresponding to a user voice that is received on the basis of first voice recognition information, based on an entity name being included in the user voice according to the obtained first text, identify a segment in the user voice in which the entity name is included. The processor is to obtain a second text corresponding to the identified segment of the user voice on the basis of the second voice recognition information, and obtain control information corresponding to the user voice on the basis of the first text and the second text.

20 Claims, 16 Drawing Sheets

Related U.S. Application Data continuation of application No. 16/664,253, filed on Oct. 25, 2019, now Pat. No. 11,205,415.

(51) Int. Cl.
  *G10L 15/04* (2013.01)
  *G10L 15/22* (2006.01)
  *G10L 15/26* (2006.01)

(52) U.S. Cl.
  CPC ............. *G10L 15/22* (2013.01); *G10L 15/26* (2013.01); *G10L 2015/223* (2013.01)

(58) Field of Classification Search
  USPC ........................................................ 704/251
  See application file for complete search history.

(56) References Cited

U.S. PATENT DOCUMENTS

| | | | |
|---|---|---|---|
| 8,606,581 | B1 | 12/2013 | Quast et al. |
| 9,257,115 | B2 | 2/2016 | Waibel et al. |
| 10,134,387 | B2 | 11/2018 | Bouk et al. |
| 10,176,167 | B2 | 1/2019 | Evermann |
| 10,186,262 | B2 | 1/2019 | Klein et al. |
| 10,402,501 | B2 * | 9/2019 | Wang ..................... G10L 15/22 |
| 10,580,405 | B1 | 3/2020 | Wang |
| 10,614,171 | B2 | 4/2020 | Orsini |
| 10,911,596 | B1 | 2/2021 | Do |
| 10,977,452 | B2 * | 4/2021 | Wang .................. G10L 15/1822 |
| 11,120,790 | B2 | 9/2021 | Mahmood |
| 11,205,415 | B2 | 12/2021 | Bok |
| 11,615,780 | B2 * | 3/2023 | Bok .................... G10L 15/1822 704/251 |
| 2003/0154077 | A1 | 8/2003 | Tahara et al. |
| 2005/0043067 | A1 | 2/2005 | Odell et al. |
| 2006/0206327 | A1 | 9/2006 | Hennecke et al. |
| 2007/0208561 | A1 | 9/2007 | Choi et al. |
| 2013/0006629 | A1 | 1/2013 | Honda et al. |
| 2014/0163975 | A1 | 6/2014 | Lee et al. |
| 2017/0287474 | A1 | 10/2017 | Maergner et al. |
| 2018/0018959 | A1 | 1/2018 | Des Jardins et al. |
| 2019/0172444 | A1 | 6/2019 | Hiroe et al. |

FOREIGN PATENT DOCUMENTS

| | | |
|---|---|---|
| JP | 2013-050742 | 3/2013 |
| KR | 10-2000-0040572 | 7/2000 |
| KR | 10-2002-0039811 | 5/2002 |
| KR | 10-2009-0066106 | 6/2009 |
| KR | 10-2012-0113717 | 10/2012 |
| KR | 10-2014-0022320 | 2/2014 |
| KR | 10-1364774 | 2/2014 |
| KR | 10-2014-0142280 | 12/2014 |
| KR | 10-2016-0037182 | 4/2016 |
| KR | 10-2016-0056734 | 5/2016 |
| KR | 2018-017936 | 2/2018 |

OTHER PUBLICATIONS

European Office Action dated Feb. 14, 2019 in corresponding European Patent Application No. 15193050.0.
Extended European Search Report dated Apr. 14, 2020 in European Patent Application No. 19200298.8.
Communication pursuant to Article 94(3) EPC, dated Apr. 20, 2021, in corresponding European Patent Application No. 19200298.8.
U.S. Office Action for U.S. Appl. No. 16/664,253 dated Apr. 16, 2021.
U.S. Notice of Allowance for U.S. Appl. No. 16/664,253 dated Aug. 12, 2021.
U.S. Notice of Allowance for U.S. Appl. No. 17/528,764 dated Nov. 23, 2022.
U.S. Appl. No. 17/528,764, filed Nov. 17, 2021, Chansik Bok et al., Samsung Electronics. Co., Ltd.
U.S. Appl. No. 16/664,253 U.S. Pat. No. 11/205,415, filed Oct. 25, 2019, Chansik Bok et al., Samsung Electronics Co., Ltd.
Extended European Search Report dated Jul. 17, 2023 in European Patent Application No. 23171573.1.

* cited by examiner

| USER VOICE | find | YOUHANDOJUN |
|---|---|---|
| LANGUAGE | ENGLISH | KOREAN |
| SEGMENT | FIRST SEGMENT | SECOND SEGMENT |
| WHETHER ENGLISH VOICE RECOGNITION IS POSSIBLE | O | X |
| ENGLISH VOICE RECOGNITION RESULT | FIND | UNRECOGNIZED |

FIG. 5

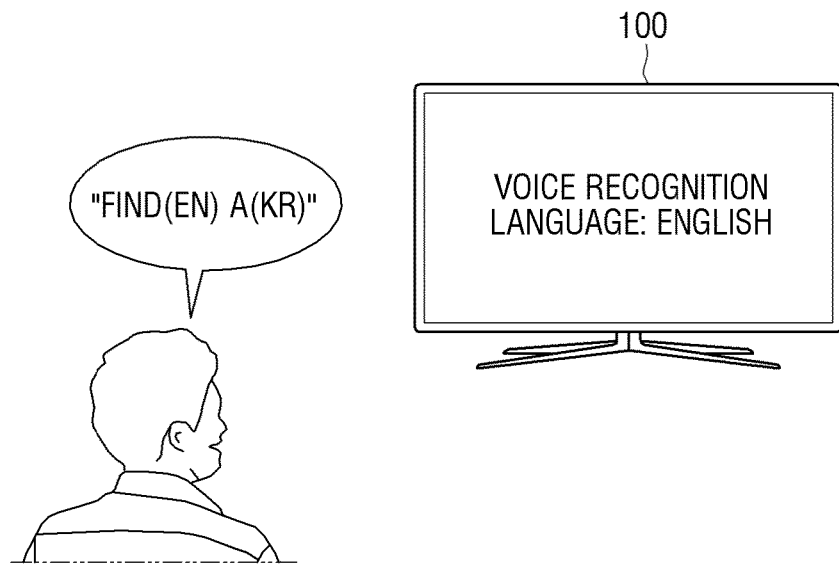

WHETHER USER VOICE INCLUDES ENTITY NAME?

| USER VOICE | FIRST SEGMENT | SECOND SEGMENT | POSSIBILITY TO INCLUDE ENTITY NAME |
|---|---|---|---|
| find(EN) A(KR) | find(RECOGNIZED) | A(UNRECOGNIZED) | O |
| search(EN) A(KR) | search(RECOGNIZED) | A(UNRECOGNIZED) | O |
| view(EN) A(KR) | view(RECOGNIZED) | A(UNRECOGNIZED) | O |
| select(EN) A(KR) | select(RECOGNIZED) | A(UNRECOGNIZED) | O |
| play(EN) A(KR) | play(RECOGNIZED) | A(UNRECOGNIZED) | O |
| turn(EN) off(EN) | turn(RECOGNIZED) | Off(RECOGNIZED) | X |
| volume(EN) up(EN) | volume(RECOGNIZED) | Up(RECOGNIZED) | X |

FIG. 6

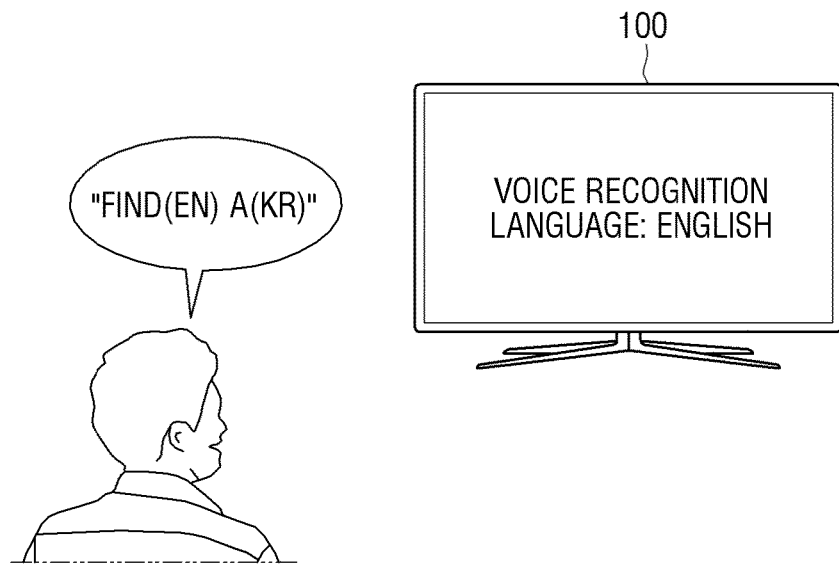

WHETHER USER VOICE INCLUDES ENTITY NAME?

| USER VOICE | FIRST SEGMENT | SECOND SEGMENT | POSSIBILITY TO INCLUDE ENTITY NAME |
|---|---|---|---|
| find(EN) A(KR) | find(RECOGNIZED) | A(UNRECOGNIZED) | O |
| search(EN) A(KR) | search(RECOGNIZED) | A(UNRECOGNIZED) | O |
| A(KR) view(EN) | A(UNRECOGNIZED) | view(RECOGNIZED) | O |
| A(KR) select(EN) | A(UNRECOGNIZED) | select(RECOGNIZED) | O |
| A(KR) play(EN) | A(UNRECOGNIZED) | play(RECOGNIZED) | O |
| turn(EN) off(EN) | turn(RECOGNIZED) | Off(RECOGNIZED) | X |
| volume(EN) up(EN) | volume(RECOGNIZED) | Up(RECOGNIZED) | X |

FIG. 7
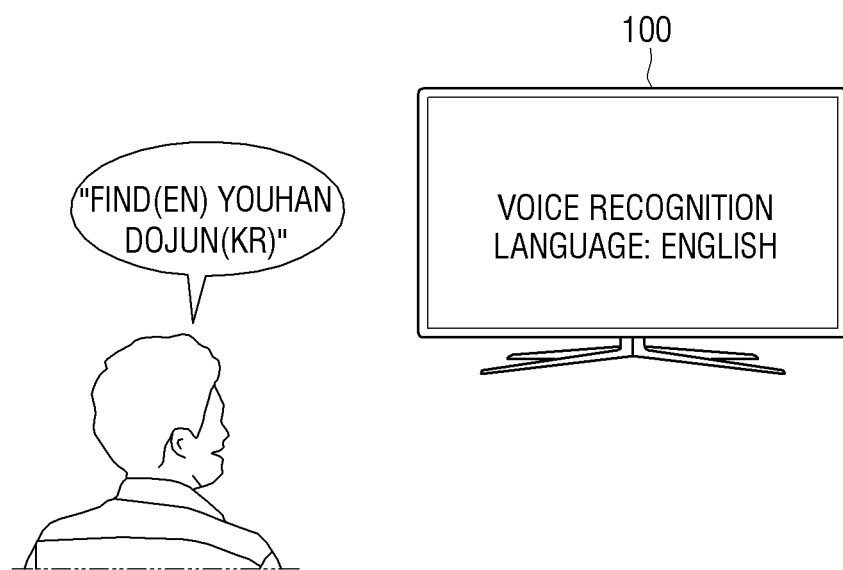
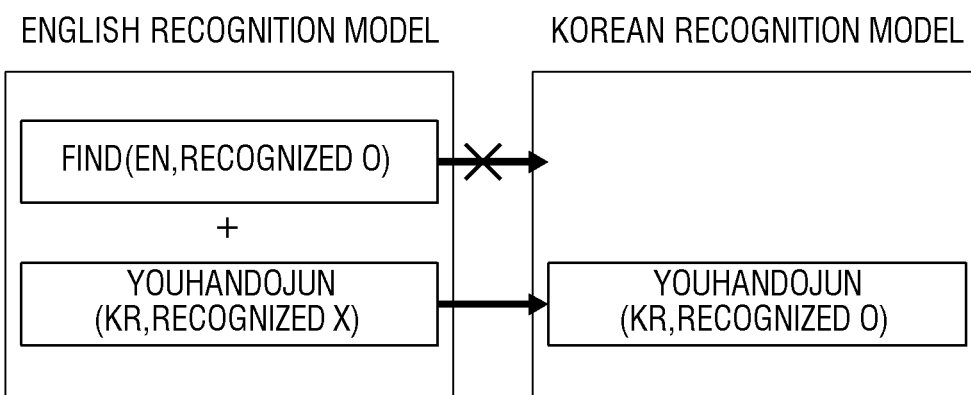

FIG. 12

| | SEGMENT 1 | SEGMENT 2 | SEGMENT 3 | UNRECOGNIZED SEGMENT | POSSIBILITY TO INCLUDE ENTITY NAME |
|---|---|---|---|---|---|
| EMBODIMENT 1 | find (EN) | YOUHANDOJUN (KR) | GAYOJAE (KR) | 2,3 | O |
| EMBODIMENT 2 | find (EN) | YOUHANDOJUN (KR) | music festival (EN) | 2 | O |
| EMBODIMENT 3 | find (EN) | finite challenge (EN) | music festival (EN) | - | O |
| EMBODIMENT 4 | Play (EN) | YOUHANDOJUN (KR) | 5minute later (EN) | 2 | O |
| EMBODIMENT 5 | Turn (EN) | Off (EN) | TV (EN) | - | X |

ELECTRONIC APPARATUS AND CONTROLLING METHOD THEREOF

CROSS-REFERENCE TO RELATED APPLICATION(S)

This Application is a Continuation of U.S. patent application Ser. No. 17/528,764, Nov. 17, 2021, which is a Continuation Application of U.S. patent application Ser. No. 16/664,253 filed on Oct. 25, 2019, which claims priority under 35 U.S.C. § 119(a) of a Korean patent application number 10-2018-0140719, filed on Nov. 15, 2018, in the Korean Intellectual Property Office, the disclosures of which are incorporated by reference herein in their entirety.

BACKGROUND

1. Field

The disclosure relates to an electronic apparatus and a controlling method thereof. More particularly, the disclosure relates to an electronic apparatus for recognizing a user voice including multiple languages and a controlling method thereof.

2. Description of Related Art

Development of a voice recognition function and improvement of a performance of an electronic device such as a TV enables voice recognition by a device having a voice recognition function in multiple languages other than one language.

For example, it is assumed that a TV supports English and Korean voice recognition function, and a user sets English as a default language. Here, when a user utters a voice including Korean, a voice recognition function is set to English and there is a problem in that the TV may not clearly recognize the user voice in Korean.

If the voice recognition function is set to English and set to Korean language, the results may come out differently. When the user utters a word in a language other than a set language, there has been a problem in that the result of the voice recognition is not identified.

Further, the number of output of the voice recognition result may be different. For example, in the voice recognition function set in English, there may be three voice recognition results, but in the voice recognition function set in Korean, there may be ten voice recognition results. So, there is a problem in that the user obtains a different result depending on whether the user sets the voice recognition function in Korean or English.

Therefore, in order to apply a suitable voice recognition model, a user should change setting directly or re-utter in a language that is set again, and there is a problem in that this may cause inconvenience.

SUMMARY

An aspect of the disclosure is to provide an electronic apparatus performing a voice recognition operation by dividing a user voice including multiple languages by languages and applying different voice recognition models, and a controlling method thereof.

According to an embodiment, an electronic apparatus includes a memory configured to store first voice recognition information related to a first language and second voice recognition information related to a second language, and a processor to obtain a first text corresponding to a user voice that is received based on the first voice recognition information, based on an entity name being included in the user voice according to the obtained first text, identify a segment in the user voice in which the entity name is included, and obtain a second text corresponding to the identified segment of the user voice based on the second voice recognition information, and obtain control information corresponding to the user voice based on the first text and the second text.

The processor is configured to identify the segment in the user voice in which the entity name is included based on the entity name being unrecognizable using the first voice recognition information.

The processor may, based on a predetermined word being included in the obtained first text, identify that the user voice includes the entity name.

The entity name may be related to a content, and the predetermined word may be related to control information for performing a search in association with the content.

The first voice recognition information may be information corresponding to a language mode of the first language that is currently set to the electronic apparatus, and the processor is configured to obtain the second text corresponding to the identified segment in the user voice in which the unrecognizable entity name is included based on the second voice recognition information corresponding to a language mode of the second language different from the language mode of the first language that is currently set.

The processor may identify a portion of the segment that includes the predetermined word in the user voice and identify a remaining portion of the segment except the identified portion of the segment in the user voice as the segment in the user voice in which the entity name is included.

The processor may, based on category information corresponding to the second text, and category information corresponding to the first text, generate a query corresponding to the category information.

Where the query corresponding to the category information is a first query, the processor may generate a second query by adding the second text to the generated first query or substituting the category information with the second text.

The processor may, based on a plurality of second texts being obtained from the user voice of the identified segment on the basis of the second voice recognition information, obtain category information corresponding to each of the plurality of second texts and generate the first query on the basis of the obtained category information.

The processor may obtain category information corresponding to a second text on the basis of database related to the second voice recognition information.

According to an embodiment, a controlling method of an electronic apparatus includes obtaining a first text corresponding to a user voice that is received based on stored first voice recognition information related to a first language; based on an entity name being included in the user voice according to the obtained first text, identifying a segment in the user voice in which the entity name is included, and obtaining a second text corresponding to the identified segment of the user voice based on stored second voice recognition information related to a second language; and obtaining control information corresponding to the user voice based on the first text and the second text.

The obtaining the second text may include identifying the segment in the user voice in which the entity name is included based on the entity name being unrecognizable using the first voice recognition information.

The obtaining the second text may include, based on a predetermined word being included in the obtained first text, identifying that the user voice includes the entity name.

The entity name may be related to a content, and the predetermined word may be related to control information for performing a search in association with the content.

The first voice recognition information corresponds to a language mode of the first language that is currently set to the electronic apparatus, and the obtaining the second text corresponding to the identified segment in the user voice in which the unrecognizable entity name is included based on the second voice recognition information corresponding to a language mode of the second language different from the language mode of the first language that is currently set.

The obtaining the second text may include identifying a portion of the segment that includes the predetermined word in the user voice and identifying a remaining portion of the segment except the identified segment in the user voice as the segment in which the entity name is included.

The controlling method may further include based on category information corresponding to the second text, and category information of the first text, generating a query corresponding to the category information.

The query corresponding to the category information is a first query, and the controlling method may further include generating a second query by adding the second text to the generated first query or substituting the category information with the second text.

The generating the first query may include, based on a plurality of second texts being obtained from the user voice of the identified segment on the basis of the second voice recognition information, obtaining category information corresponding to each of the plurality of second texts and generating the first query on the basis of the obtained category information.

The generating the first query may include obtaining category information corresponding to a second text based on database related to the second voice recognition information.

According to an embodiment, a non-transitory computer readable medium storing computer instructions executable by a processor of an electronic apparatus to cause the electronic apparatus to perform an operation including obtaining a first text corresponding to a user voice that is received based on first voice recognition information related to a first language; based on an entity name being included in the user voice according to the obtained first text, identifying a segment in the user voice in which the entity name is included, and obtaining a second text corresponding to the identified segment of the user voice based on the second voice recognition information related to a second language; and obtaining control information corresponding to the user voice based on the first text and the second text.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a view illustrating an operation to identify whether the user voice includes an entity name according to an embodiment;

FIG. 6 is a view illustrating an operation to identify an entity name according an embodiment;

FIG. 7 is a view illustrating an embodiment of using a model in another language for an unrecognized segment;

FIG. 12 is a view illustrating various embodiments in which a user voice is composed of three segments;

DETAILED DESCRIPTION

Figure 1:
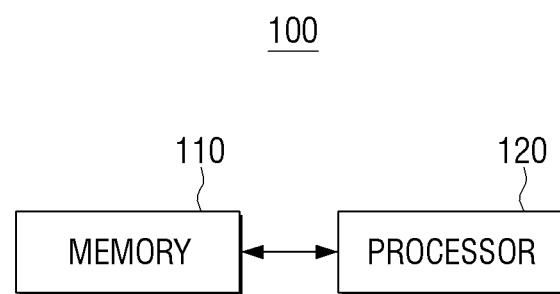
FIG. 1 is a block diagram illustrating an electronic apparatus according to an embodiment.

Before specifically describing the disclosure, a method for demonstrating the present specification and drawings will be described.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different exemplary embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed description of related known technologies may unnecessarily confuse the gist of the disclosure, the detailed description will be omitted.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain part includes a certain element, unless specified to the contrary, this means that another element may be additionally included, rather than precluding another element.

FIG. 1 is a block diagram illustrating an electronic apparatus according to an embodiment.

Referring to FIG. 1, an electronic apparatus 100 according to an embodiment may include a memory 110 and a processor 120.

The electronic apparatus 100 may be a TV, a desktop PC, a notebook, a smartphone, a tablet PC, a server, or the like. Alternatively, the electronic apparatus 100 may be implemented as a system in which clouding computer environment is established, that is, a cloud server. To be specific, the electronic apparatus 100 may be an apparatus which includes deep learning-based recognition system. In the meantime, the aforementioned example is merely to describe an electronic apparatus and the embodiment is not limited to the apparatus above.

The memory 110 may be implemented as an internal memory such as a read-only memory (ROM) (for example, electrically erasable programmable read-only memory (EEPROM)) and a random-access memory (RAM) or a memory separate from the processor 120.

Here, the memory 110 may store first voice recognition information related to a first language and second voice recognition information related to a second language. Here, the first voice recognition information (or the second voice recognition information) related to the first language (or the second language) may include various information necessary for performing voice recognition based on the first language (or the second language). For example, at least one of voice preprocessing information, pattern recognition information, or language processing information may be included. For example, the first language recognition model and the second language recognition model may be stored. The first language and the second language are different languages and may be one of various languages including French, German, Chinese, Japanese, Spanish, Russian, or the like.

The memory 110 may prestore words which enables identification that an entity name is included in a user voice. This will be described later with respect to an operation of the processor 120.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The processor 120 may perform overall control operation of an electronic apparatus. To be specific, the processor performs a function to control overall operations of the electronic apparatus.

The processor 120 may be implemented as a digital signal processor (DSP), a microprocessor, and a time controller (TCON) for processing a digital image signal, but is not limited thereto. The processor 120 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 120 may be implemented in a system on chip (SoC) type or a large scale integration (LSI) type which a processing algorithm is built therein or in a field programmable gate array (FPGA) type.

When receiving a user voice, the processor 120 obtains a first text corresponding to a user voice based on first voice recognition information. When it is identified that a user voice includes an entity name based on the obtained first text, the processor 120, then, identify a segment (or interval, or section) of a user voice in which an entity name is included, and obtain a second text corresponding to the user voice of the identified segment based on the second voice recognition information, and obtain control information corresponding to the user voice based on the first text and the second text.

The processor 120 may receive data for a user voice. Here, the user voice data may be obtained by directly receiving a user voice through a microphone (not shown) included in the electronic apparatus 100 or by receiving the voice through an external device (not shown). When receiving the user voice through an external device (not shown), the external device includes a microphone, so that only voice data may be transmitted to the electronic apparatus 100. In actual implementation, the external device may correspond to a remote control device including a microphone.

According to an embodiment, the processor 120 may perform a voice recognition operation by the first language that is currently set to the electronic apparatus 100. For example, a language mode for voice recognition may be set to the electronic apparatus 100, and this may be automatically or manually changed based on a user selection or various information such as a location of the electronic apparatus 100, or the like.

For example, it is assumed that the user has uttered the "find (EN) youhandojun (KR)", and the voice recognition language currently set is English. The processor 120 may perform voice recognition in English, which is the set voice recognition language. Specifically, the processor 120 may obtain an English text corresponding to the user voice. Here, the obtained text may be referred to as the first text. In the example described above, the processor 120 may obtain English text information (first text) corresponding to find (EN).

It has been described that the language is English, Korean, or the like, but the language is not limited thereto, and language of various countries such as French, German, Chinese, Japanese, Spanish, Russian, or the like, may be applied to the embodiment. In addition, it has been described that two languages have been described, but three or more languages may be applied in the actual implementation. An embodiment in which three languages are applied will be described below in FIG. 13.

The processor 120 may identify whether an entity name is included in the user voice based on the first text information. According to an embodiment "an entity name" may refer to a subject of a specific operation. For example, the entity name may be a subject related to a search operation, an execution operation, or the like, such as a content. However, the embodiment is not limited thereto, and may mean a subject of various operations to which the embodiment may be applied. The processor 120 may identify whether the entity name is included in the user voice, and the first text information may not necessarily include the entity name.

For example, in the above-mentioned example of "find (EN) youhandojun (KR)", since the first language is English, the first text information may be a find (EN) part. The entity name may be related to the content, and the first text information does not include the entity name. However, the processor 120 may identify or anticipate that the user voice includes the entity name using only find (EN). In general, when a user utters find (EN), it can be generally expected that the entity name is recognized together thereafter.

Reflecting the foregoing, the processor 120, when a predetermined word is included in the obtained first text, may identify that the user voice includes the entity name.

The predetermined word may be a word related to a specific operation. Here, the specific operation may be an operation including the entity name, for example, operations such as "search," "execute," "play", or the like. For example, the predetermined word may correspond to any one of find, search, view, select, or play. The above words are merely exemplary, and may be updated through addition and deletion according to user setting.

When it is identified that the user voice includes the entity name that is not recognized based on the first voice recognition information, the processor 120 may identify a segment(or interval, or section) including the unrecognized entity name in the user voice.

The first voice recognition information is information corresponding to a language mode currently set on the electronic apparatus, and the processor 120, when a segment including the entity name that is not recognized in the user voice is identified, may obtain a second text corresponding to the user voice of the identified segment based on the second voice recognition information corresponding to the language mode different from the currently-set language mode. Here, the first language mode and the second language mode may become different depending on a user's selection or a region where the electronic apparatus 100 is sold. For example, as for the electronic apparatus 100 sold in the United States, the first language mode may be set to English, and the second language mode may be set to Korean. On the contrary, as for the electronic apparatus 100 sold in Korea, the first language mode may be set to Korean, and the second language mode may be set to English.

The electronic apparatus 100 may include a plurality of language modes, and each language mode may be pre-stored according to a user setting. When the segment including the entity name that is not recognized in the user voice is identified, the processor 120 may obtain a text corresponding to the user voice of the segment identified based on voice recognition information corresponding to the second language mode, the third language mode, and the fourth language mode, according to a predetermined order. According to another embodiment, the electronic apparatus 100 stores a plurality of language modes, and if a segment including the entity name not recognized in the user voice is identified, the processor 120 may identify whether the entity name that is not recognized is included in a specific language. If the language mode for the specific language is stored in the electronic apparatus 100, the processor 120 may obtain a text corresponding to the user voice in the identified segment based on the voice recognition information corresponding to the identified specific language mode.

Here, the processor 120 may identify a segment including a predetermined word in the user voice, and identify a segment excluding the identified segment in the user voice as a segment including the entity name.

For example, it is assumed that, in the aforementioned example "find (EN) youhandojun (KR)", the first voice recognition information (first language) is English. The find (EN) part may be recognized in English, but the youhandojun (KR) part may not be recognized. In this case, the user voice may divide the find (EN) part as the first segment, and youhandojun (KR) part as the second segment. The processor 120 may identify that the entity name is included by the English speech recognition model, but if the entity name is not included in the first text, it may be estimated (anticipated) that the unrecognized part (segment) includes the entity name. Here, the processor 120 may identify a part of youhandojun (KR) other than the find (EN) part recognized by the first voice recognition information (first language) as a segment including the entity name.

The processor 120 may use the second voice recognition information (second language) to identify and recognize the unrecognized segment. The processor 120 may obtain the second text corresponding to the user voice of the identified based on the second voice recognition information. Here, when voice recognition information corresponding to another language other than the first and second voice recognition information is stored in the memory 110, the second voice recognition information may be identified based on priority among the voice recognition information, user setting information, location information of the electronic apparatus 100, or the like.

The processor 120 may generate a first query corresponding to category information. The first query is generated based on the category information corresponding to the second text and the first text. The reason for generating a query based on the category information is to generate a query of a corresponding format using category information, as a format of query may be different for each category. In this case, the processor 120 may obtain category information corresponding to the second text based on the database related to the second voice recognition information.

For example, the category information may be a criterion for dividing the entities, and may mean at least one of title, subject, actor, running time, and level.

For example, in the same manner as the aforementioned embodiment, it is assumed that the user utters "find (EN) youhandojun (KR)", first language is English, and second language is Korean. The processor 120 may obtain the first text information (find (EN)) and the second text information (youhandojun (KR)), and generate the first query using category information (title) corresponding to the second text information (youhandojun (KR)).

Here, the processor 120 may generate a second query by adding the second text to the generated first query or substituting the category information with the second text. Specific flowchart will be described in operations S1525 and S1530 of FIG. 15

According to still another embodiment, when a plurality of second texts are obtained from the user voice in the identified segment, the processor 120 may obtain category information corresponding to each of the plurality of second texts and generate the first query based on the obtained category information.

For example, it is assumed that the user utters "find (EN) youhandojun (KR) gayojae (KR)". The processor 120 may obtain the Korean text corresponding to the youhandojun (KR) and gayojae (KR). That is, the processor 120 may obtain two second texts and each category information. The category information corresponding to youhandojun (KR) may correspond to the title. In addition, the category information corresponding to the gayojae (KR) may correspond to the subject. The processor 120 may generate the first query based on the title and the subject.

The electronic apparatus 100 according to the aforementioned embodiment performs an operation to recognize a user voice including a plurality of languages. The voice recognition operation may include an operation to convert the user voice into a text and an operation to analyze a user's utterance intention based on the converted text information.

When the utters in a plurality of languages, only parts that are set in the voice recognition language are recognized, in general. Thus, as described herein, when both the first voice recognition information (first language) and the second voice recognition information (the second language) are included, a voice recognition operation for a user's utterance including multiple languages may be accurately performed and thus, the recognition rate may be improved.

Here, the segment including the entity name is separately identified, and an unrecognized part is separately distinguished, and an operation to recognize only the unrecognized part in a new language is performed. Therefore, not all the user voices are newly analyzed, and the operation of recognizing only the unrecognized part in a new language is performed. The above-described operations may have an effect of improving data processing speed and reducing processing amount.

Further, when an intention analysis is performed by combining text information consisting of a plurality of languages, the recognition rate may fall. However, in this disclosure, a query may be generated by using information in one language other than a plurality of languages, using category information in accordance with certain embodiments. In this case, the query generation and intention analysis operation may be performed with information composed of one language and thus, the recognition rate may be improved.

Figure 2:
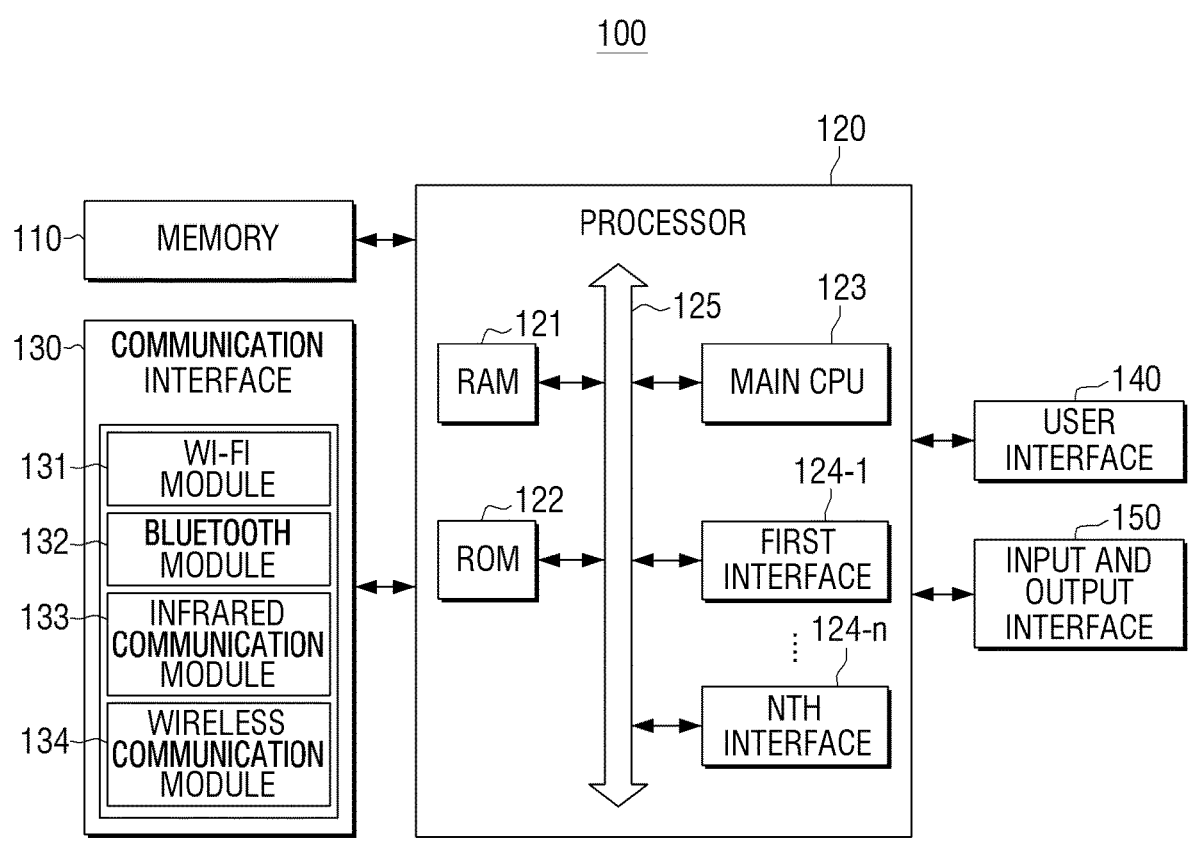
FIG. 2 is a block diagram illustrating a specific configuration of the electronic apparatus of FIG. 1.

FIG. 2 is a block diagram illustrating a specific configuration of the electronic apparatus of FIG. 1.

Referring to FIG. 2, the electronic apparatus 100 according to an embodiment may include a memory 110, a processor 120, a communication interface 130, a user interface 140, and input and output interface 150.

The operations overlapping with the descriptions of the memory 110 and the processor 120 as described above will not be described.

The processor 120 controls overall operations of the electronic apparatus 100 using various programs stored in the memory 110.

To be specific, the processor 120 includes the RAM 121, the ROM 122, a main CPU 123, a first to $n^{th}$ interfaces 124-1~124-n, and a bus 125.

The RAM 121, ROM 122, main CPU 123, the first to $n^{th}$ interfaces 124-1 to 124-n, or the like, may be interconnected through the bus 125.

The ROM 122 stores one or more instructions for booting the system and the like. When the turn-on instruction is input and power is supplied, the CPU 123 copies the OS stored in the memory 110 to the RAM 121 according to the stored one or more instructions in the ROM 122, and executes the OS to boot the system. When the booting is completed, the CPU 123 copies various application programs stored in the memory 110 to the RAM 121, executes the application program copied to the RAM 121, and performs various operations The main CPU 123 accesses the memory 110 and performs booting using an operating system (OS) stored in the memory 110, and performs various operations using various programs, contents data, or the like, stored in the memory 110.

The first to $n^{th}$ interface 124-1 to 124-n are connected to the various elements described above. One of the interfaces may be a network interface connected to an external device through the network.

The processor 120 may perform a graphic processing function (video processing function). For example, the processor 120 may generate a screen including various objects such as icons, images, text, and the like. Here, a calculator (not shown) may calculate an attribute value such as a coordinate value, a shape, a size, and a color to be displayed by each object according to the layout of the screen based on the received control command. A renderer (not shown) may generate display screens of various layouts including objects based on the attribute value calculated by the calculator (not shown). The processor 120 may perform various image processing such as decoding, scaling, noise filtering, frame rate conversion, resolution conversion, or the like, for the video data.

The processor 120 may perform processing of audio data. Specifically, the processor 120 may perform various image processing such as decoding, amplifying, noise filtering, and the like, on the audio data.

The communication interface 130 may communicate with other external devices in various types. The communication interface 130 includes a Wi-Fi module 131, a Bluetooth module 132, an infrared communication module 133, a wireless communication module 134, or the like. The processor 120 may communicate with various external devices using the communication interface 130. Here, the external device may include a display device such as a TV, an image processing device such as a set-top box, an external server, a control device such as a remote control, an audio output device such as a Bluetooth speaker, a lighting device, a smart cleaner, an Internet of things (TOT) home manager, or the like.

The Wi-Fi module 131 and the Bluetooth module 132 perform communication using Wi-Fi method and Bluetooth method, respectively. When using the Wi-Fi module 131 or the Bluetooth module 132, various connection information such as a service set identifier (SSID) and a session key may be transmitted and received first, and communication information may be transmitted after communication connection.

The infrared ray communication module 133 performs communication according to infrared data association (IrDA) technology that transmits data wireless to local area using infrared ray between visible rays and millimeter waves.

The wireless communication module 134 means a module performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the Wi-Fi module 131 and the Bluetooth module 132 described above.

The communication interface 130 may include at least one of a local area network (LAN) module, Ethernet module, or wired communication module performing communication using a pair cable, a coaxial cable, an optical cable, or the like.

According to an embodiment, the communication interface 130 may use the same communication module (for example, Wi-Fi module) to communicate with an external device such as a remote controller and an external server.

In accordance with another example, the communication interface 130 may utilize different communication modules (for example, Wi-Fi modules) to communicate with an external device such as a remote controller and an external server. For example, the communication interface 130 may use at least one of an Ethernet module or a WiFi module to communicate with an external server, and may use a bluetooth (BT) module to communicate with an external device such as a remote controller. However, this is merely exemplary, and the communication interface 130 may use at least one communication module among various communication modules when communicating with a plurality of external devices or an external server.

The communication interface 130 may further include a tuner and a demodulator according to an example.

The tuner (not shown) may receive a radio frequency (RF) broadcasting signal by tuning a channel selected by a user or all the prestored channels, from among RF broadcasting signals that are received through the antenna.

A demodulator (not shown) may receive and demodulate a digital intermediate frequency (DIF) signal that is converted by the tuner, and perform channel decoding, or the like.

The user interface 140 may be implemented as a button, a touch pad, a mouse, and a keyboard, or may be implemented as a touch screen which may perform the display function and a manipulation input function as well. Here, the button may be various types of buttons such as a mechanical button, a touch pad, a wheel, or the like formed on an arbitrary region such as a front part, a side part, a back part, or the like, of an outer part of the main body of the electronic apparatus 100.

The input and output interface 150 may be one of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The HDMI is an interface capable of transmitting high performance data for an AV device which inputs and outputs audio and video signals. The DP is the interface which may implement an image of a full HD of 1920×1080 but also an ultra-high resolution screen such as 2560×1600 or 3840× 2160, and a 3D stereoscopic image, and transmit a digital sound. The Thunderbolt is an input/output interface for high-speed data transmission and connection, and may connect a PC, a display, a storage device, and the like, with one port in parallel.

The input and output interface 150 may input and output at least one of an audio signal and a video signal.

According to an example, the input and output interface 150 may include a port to input and output only an audio signal or a port to input and output only a video signal as a separate port, or may be implemented as a port which input and output both the audio signal and the video signal.

The electronic apparatus 100 may be implemented as a device not including a display and transmit an image signal to a separate display device.

For voice recognition of a voice signal received from the external device, the electronic apparatus 100 may transmit the corresponding voice signal to an external server.

In this case, a communication module for communicating with the external device and the external server may be implemented as one. For example, a communication module for communicating with the external device and the external server may be the same as the Wi-Fi module.

A communication module for communicating with the external device and the external server may be implemented separately. For example, communication with the external device may be performed through a Bluetooth module, and communication with the external server may be performed through the Ethernet modem or the Wi-Fi module.

The electronic apparatus 100 according to an embodiment may transmit a received digital audio signal to a voice recognition server. In this case, the voice recognition server may convert the digital audio signal into text information using a speech to text (STT). In this case, the voice recognition server may transmit text information to another server or an electronic apparatus to perform a search corresponding to the text information, and in some cases, perform a direct search.

The electronic apparatus 100 according to another embodiment may convert the user voice signal to text information by directly applying the STT function to the digital sound signal, and transmit the converted text information to the external server.

Figure 3:
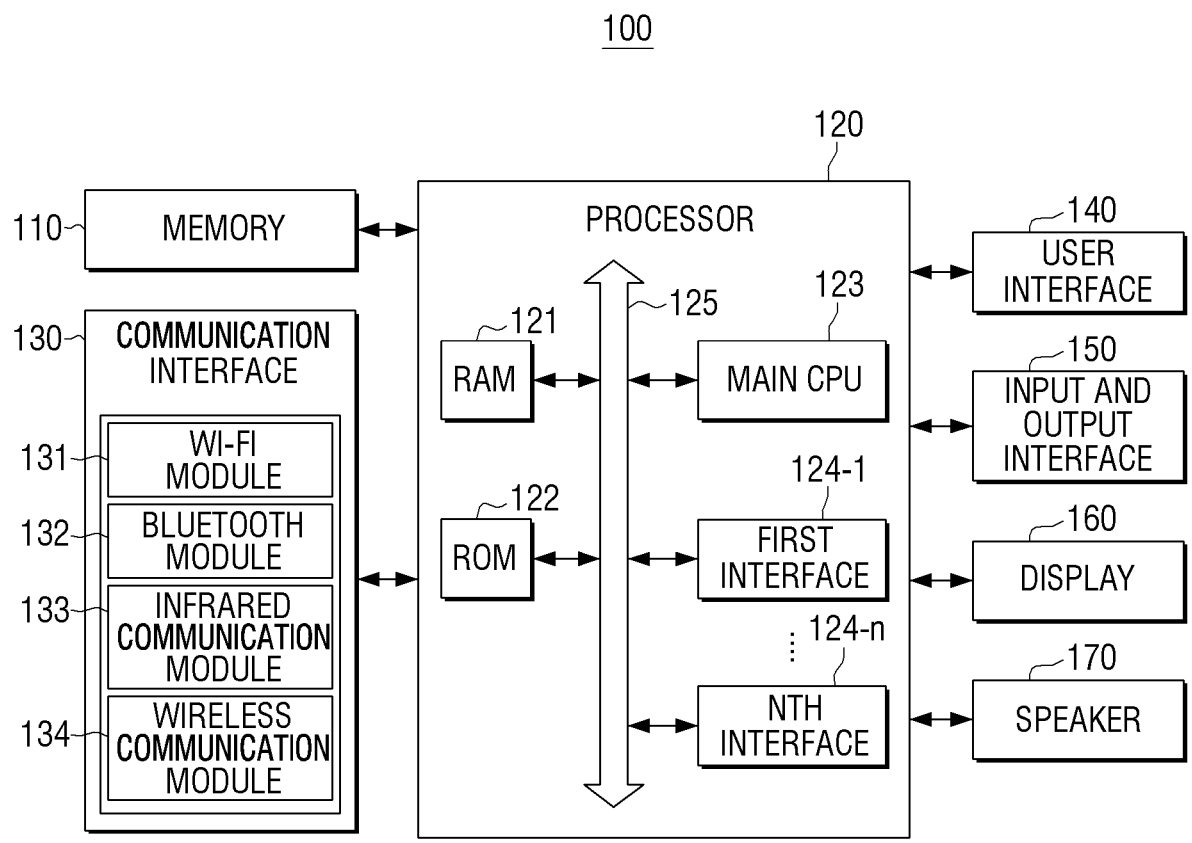
FIG. 3 is a block diagram illustrating a specific configuration of the electronic apparatus of FIG. 1 according to an embodiment.

FIG. 3 is a block diagram illustrating a specific configuration of the electronic apparatus of FIG. 1 according to still another embodiment.

Referring to FIG. 3, a display 160 and a speaker 170 may be further included, in addition to the configurations of FIG. 2.

The display 160 may be implemented as various types of a display such as a liquid crystal display (LCD), an organic light emitting diode (OLED) display, a plasma display panel (PDP), or the like. In the display 160, a driving circuit and a backlight unit, which may be implemented in the form of an a-si TFT, a low temperature poly silicon (LTPS) TFT, an organic TFT (OTFT) may be included as well. The display 160 may be implemented as a touch screen coupled with a touch sensor, a flexible display, a third-dimensional display (3D display), or the like.

The display 160 according to an embodiment may include not only a display panel for outputting an image but also a bezel for housing a display panel. In particular, the bezel according to an embodiment may include a touch sensor (not shown) to sense a user interaction.

The speaker 170 may be an element to output various audio data, various alarm sounds, a voice message, or the like, which are processed by the input and output interface 150.

In the meantime, the electronic apparatus 100 may further include a microphone (not shown). The microphone is an element to receive a user voice or other sound and convert to audio data. In this case, the microphone may convert the received analog user voice signal to a digital signal and transmit to the electronic apparatus 100.

The microphone (not shown) may receive the user voice in an active state. For example, the microphone may be integrally formed as an integral unit on an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

According to another embodiment, the electronic apparatus 100 may receive a user voice from an external device (not shown) including a microphone. For example, the external device may be implemented as a remote control device (remote controller), but is not limited thereto.

Here, when the remote control device (remote controller) receives the user's analog voice signal through the microphone, the remote control device (remote controller) may convert the analog voice signal into the digital voice signal. The remote control device (remote controller) may transmit the converted digital voice signal to the electronic apparatus 100 using at least one of an infrared ray, a Wi-Fi or a Bluetooth communication method. When the digital voice signal is received from the external device, the electronic apparatus 100 may perform voice recognition based on the received digital voice signal and perform a control operation based on the voice recognition result. However, according to another embodiment, the remote control device (remote controller) may perform a voice recognition operation on the digital voice signal and transmit the information corresponding to the voice recognition result to the electronic apparatus 100. Here, the information corresponding to the voice recognition result may be at least one of the voice recognition result itself or a control command corresponding to the voice recognition result.

According to still another embodiment, the external device may be implemented as a smartphone including a microphone. In this case, the smartphone may remotely control the electronic apparatus 100 using a remote control application which performs a pre-installed remote control function.

The smartphone may convert an analog voice signal into a digital voice signal when the user's analog voice signal is received through the microphone. In this case, the smartphone may perform voice recognition on the digital voice signal using the voice recognition application. Here, the voice recognition application may be the same as or different from the remote control application described above. When the smartphone recognizes the voice recognition of the digital voice signal, the smartphone may remotely control the electronic apparatus 100 using the remote control application based on the voice recognition result. However, according to another embodiment, the smartphone may transmit the converted digital voice signal to the electronic apparatus 100 using at least one of infrared, Wi-Fi or Bluetooth communication methods. In this case, when the digital voice signal is received from the external device, the electronic apparatus 100 may perform voice recognition based on the received digital voice signal and perform a control operation based on the voice recognition result.

Figure 4:
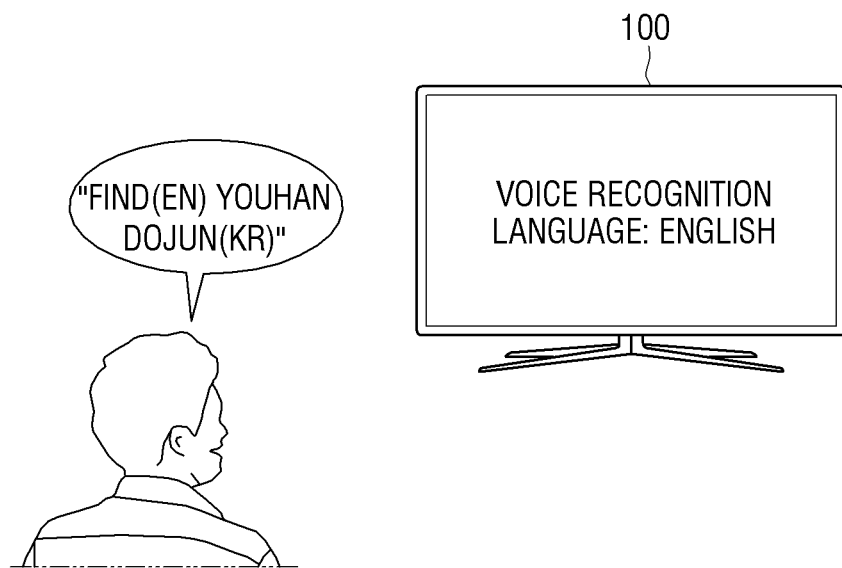
FIG. 4 is a view illustrating an embodiment of performing a voice recognition operation for a user voice including multiple languages.

FIG. 4 is a view illustrating an embodiment of performing a voice recognition operation for a user voice including multiple languages.

For convenience of description, it is assumed that the part marked with (EN) means the part which the user utters in English, and the part marked with (KR) means that the part which the user utters in Korean.

Referring to FIG. 4, it is assumed that the user utters "find (EN) youhandojun (KR)". The find (EN) part means that the user uttered in English, and the youhandojun (KR) means that the part was uttered in Korean. The find (EN) segment, which is the first utterance segment of the user, is the first segment, and the youhandojun (KR) may be named the second segment. The criterion for distinguishing the first segment and the second segment may be time.

The electronic apparatus 100 assumes that a voice recognition language has been set to English. Thus, an English voice recognition operation may be performed on find (EN), and an English voice recognition result may be obtained. However, since a voice recognition language is set to English, youhandojun (KR) uttered by the user is in Korean language, so an English voice recognition operation may not be performed. Therefore, an English voice recognition result may not be obtained for the youhandojun (KR).

Since the language set in the current electronic apparatus 100 is English, the electronic apparatus 100 may not clearly recognize the youhandojun (KR) part. As one language is basically set in the electronic apparatus 100, the recognition rate of the voice recognition operation may not be good when the user utters the content including multiple languages.

In FIG. 4, it is assumed that the user utters "find (EN) youhandojun (KR)" and the voice recognition language is English. Here, the electronic apparatus 100 may identify that the user voice includes the entity name, even though the electronic apparatus 100 may not recognize the youhandojun (KR) part.

FIG. 5 is a view illustrating an operation to identify whether the user voice includes an entity name.

In FIG. 5, it is assumed that A (KR) is uttered instead of youhandojun (KR) for convenience of description. A (KR) means that the user utters the word A in Korean language.

Referring to FIG. 5, it is assumed that the user utters "find (EN) A (KR)". Here, the electronic apparatus 100 may determine whether the user's uttered voice includes the entity name, by performing a voice recognition operation.

The entity name may mean a name of an entity for analyzing an intent. For example, the entity name may mean a name of a content such as a name of a soap opera, a name of a channel, a name of a movie, or the like.

Referring to FIG. 5, even if A is not recognized, the electronic apparatus 100 may identify that the user voice includes the entity name. This is because the user voice includes the find (EN) part. The electronic apparatus 100 may expect that if the user voice includes find (EN), the subsequent voice will be the entity name. For example, since the meaning of find (EN) is the user's command to find any content or information, it may be expected that the unrecognized part A (KR) is a subject of command to find by A (KR).

Therefore, even though a part of the user utterance is not recognized, it may be identified that the user voice includes the entity name.

Referring to FIG. 5, an embodiment in which the first segment and the second segment are divided according to a user voice and whether a user voice may include an entity name may be determined is described.

It is assumed that the user voice includes at least one of find, search, view, select, or play, and the electronic apparatus 100 recognizes this. In this case, even if there is an unrecognized part in the user voice, the electronic apparatus 100 may identify that the user voice includes the entity name.

Including the entity name may mean that a detail of a specific content is included. Including the entity name may mean that a specific result is to be output using the database.

In the meantime, it is assumed that the user voice includes at least one of turn, off, on, volume, up, and down and that the electronic apparatus 100 recognizes this. In this case, the user voice may be identified as not including the entity name, because words such as turn, off, on, volume, up and down are words used together with the functions of the device itself (power on, power off, channel change, volume change). In this case, the technique of the disclosure may not be necessary. The words such as turn, off, on, volume, up, down, or the like may not be used with the content, and the operation of the disclosure may not be necessary.

In describing FIG. 5, the above words are merely an example to facilitate the description, and the words may be changed by user setting.

FIG. 6 is a view illustrating an operation to identify an entity name according to still another embodiment.

In FIG. 5, the user voice is divided into the first segment and the second segment. It has been described that the user voice in English is recognized in the first segment, and the user voice in Korean is not recognized in the second segment.

However, it is not necessary that the voice of the first segment is recognized. It is assumed that the user utters Korean in the first segment, and utters English in the second segment. In this case, the electronic apparatus 100 may identify that the user voice includes the entity name.

Referring to FIG. 6, when the user utters "A (KR) view (EN)", "A (KR) select (EN)", "A (KR) play (EN)", the electronic apparatus 100 may identify that the user voice includes the entity name.

FIG. 7 is a view illustrating an embodiment of using a model in another language for an unrecognized segment.

It is assumed that the voice recognition language of the electronic apparatus 100 is set to English, and the user utters "find (EN) youhandojun (KR)". The electronic apparatus 100 may perform a voice recognition operation for "find (EN) youhandojun (KR)" using an English recognition model. Here, the English recognition model may clearly recognize the find (EN) part, and may not recognize youhandojun (KR) part.

The electronic apparatus 100 may identify a segment corresponding to youhandojun (KR) which the English recognition model fails to recognize, and transmit the corresponding segment to the Korean recognition model. For example, youhandojun (KR) is not recognized with the English recognition model, and the electronic apparatus 100 may transmit the youhandojun (KR) part to the Korean recognition model to perform a recognition operation. The electronic apparatus 100 may not transmit, to the Korean recognition model, the find (EN) part which the English recognition model clearly recognized. The electronic apparatus 100 may reduce data processing time and processing amount of the processor by selectively transmitting the unrecognized part.

The electronic apparatus 100 may obtain the English text information for the find (EN) part recognized by the English recognition model, and obtain Korean text information for the youhandojun (KR) part recognized by the Korean recognition model.

Figure 8:
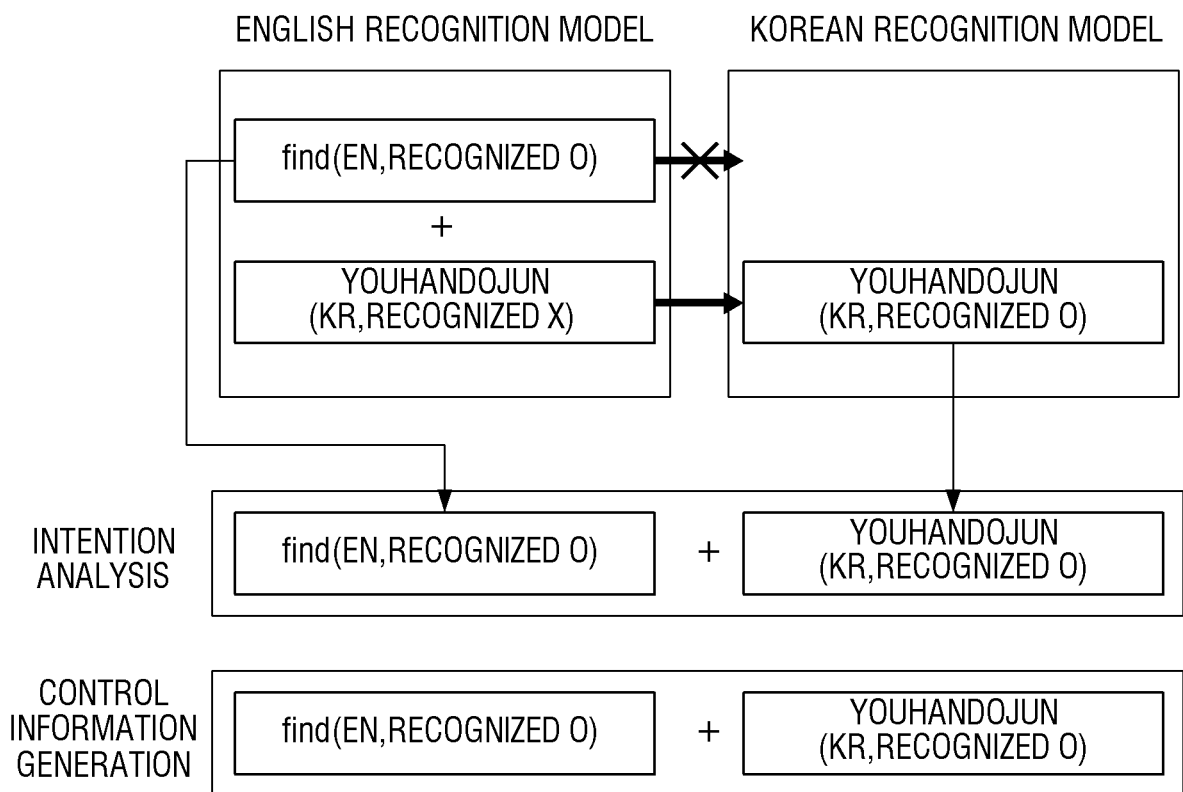
FIG. 8 is a view illustrating intention analysis and an operation to generate control information using text information obtained in FIG. 7 according to an embodiment.

FIG. 8 is a view illustrating intention analysis and an operation to generate control information using text information obtained in FIG. 7.

As a result of FIG. 7, the electronic apparatus 100 obtained the text information corresponding to the find (EN) and youhandojun (KR). Here, the electronic apparatus 100 may obtain the find (EN) part as the English text, and obtain the youhandojun (KR) part as the Korean text.

The electronic apparatus 100 may perform an intention analysis operation using English text information corresponding to the find (EN) part and the Korean text information corresponding to youhandojun (KR). The electronic apparatus 100 may generate the control information based on a result of performing the intention analysis operation.

Here, the intention analysis may mean analyzing the intention of the user included by the text information, based on the text information included in the user voice. For example, when the intention analysis is performed using the text information corresponding to "find (EN) youhandojun (KR)", the electronic apparatus 100 may analyze that the user voice includes the intention of searching for a content of youhandojun (KR).

The electronic apparatus 100 may generate the control information for controlling the electronic apparatus 100 so as to find a content having the entity name of youhandojun (KR). Here, the control information may be a control command of performing a specific operation of the electronic apparatus 100.

In FIG. 8, it has been described that the control information is information for controlling the electronic apparatus 100. However, according to still another embodiment, the electronic apparatus 100 may generate only the control information, and in reality, it may be an external device which performs an operation corresponding to the user voice. For example, the electronic apparatus 100 may perform control information only, and the external device may perform an operation to search for a content.

In the meantime, in performing the intention analysis, if different languages are included in the user voice, the recognition rate may not be good. Therefore, it may be necessary a method to improve the recognition rate without performing the intention analysis using different languages.

Figure 9:
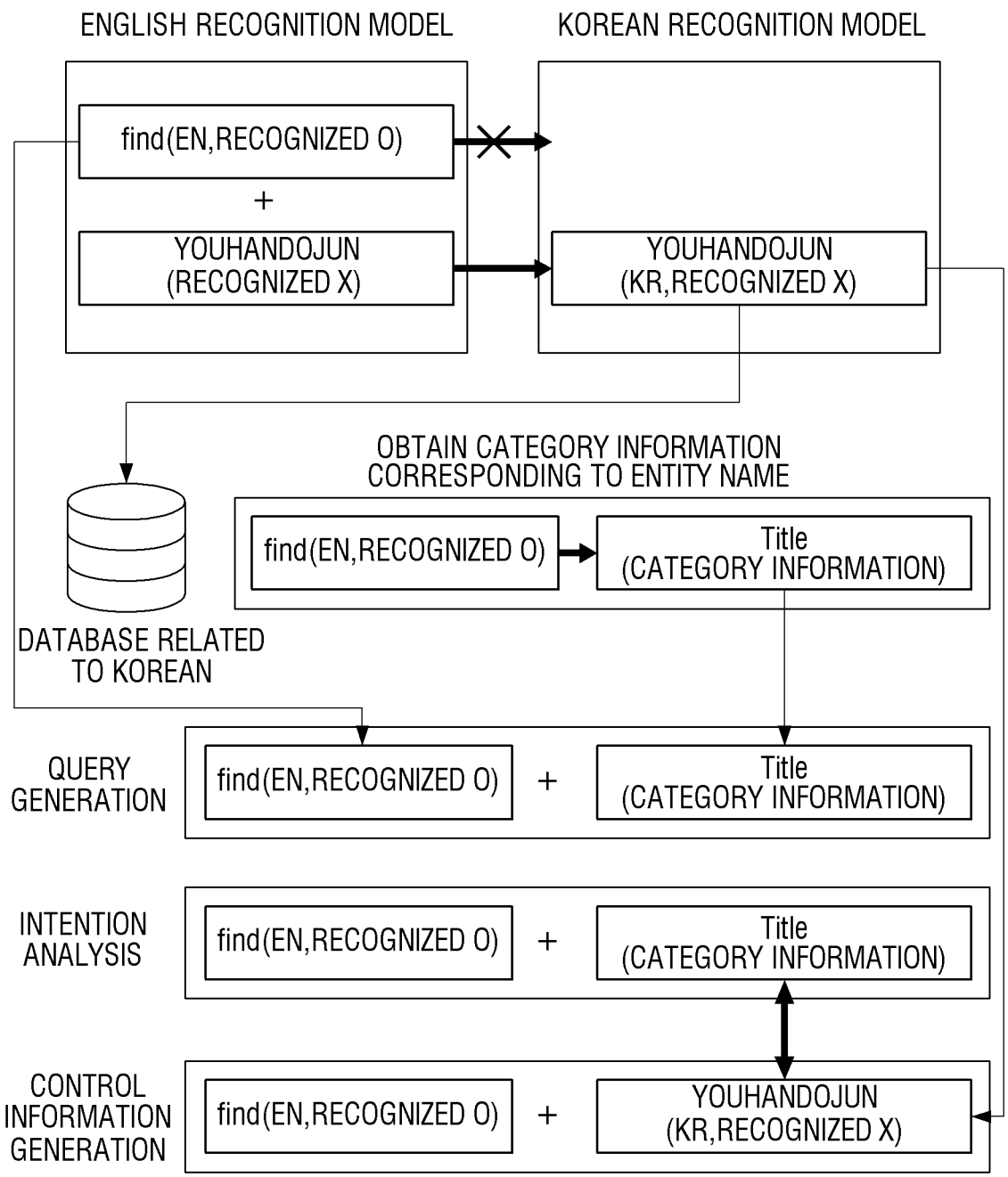
FIG. 9 is a view illustrating an operation to generate a query using category information according to an embodiment.

FIG. 9 is a view illustrating an operation to generate a query using category information.

As the result obtained in FIG. 7, it is assumed that the text information corresponding to the find (EN) and youhandojun (KR) are obtained from the user voice.

The electronic apparatus 100 may obtain the Korean text information corresponding to the youhandojun (KR) and compare the text information with the database related to Korean. Here, the database related to Korean may mean a storage space including information related to a plurality of entity names. In particular, the database may be implemented to be included in the electronic apparatus 100 or implemented as an external server.

The electronic apparatus 100 may obtain the category information corresponding to youhandojun (KR) using the Korean text information and Korean database of youhandojun (KR). Here, the category information may be an identification item corresponding to the entity name. For example, the category information may be a criterion for dividing the corresponding objects and may mean at least one of a title, a subject, an actor, running time, and a level.

The electronic apparatus 100 may obtain the category information corresponding to the Korean text information using the Korean text information of youhandojun (KR). For example, it is assumed that the database stores that the youhandojun (KR) corresponds to the title of the content. When recognizing youhandojun (KR), the electronic apparatus 100 may identify that the category of youhandojun (KR) is the title, using the Korean database.

The electronic apparatus 100 may generate a query using the English text information of find (EN) and the title that is the category information of youhandojun (KR) find (EN). The query may be a code for classifying and searching for data.

The intention analysis operation may be performed using the query generated by using the English text information of find (EN) and the title which is category information. Here, the electronic apparatus 100 may not use the Korean text information of the youhandojun (KR) in performing the intention analysis. In this case, in performing the intention analysis operation, different languages may not be simultaneously included. The electronic apparatus 100 may then predict that the user has uttered with the intention to search for a title. The electronic apparatus 100 may identify that the user has the intention to search for a title as a result of the intention analysis.

Here, the electronic apparatus 100 does not directly use the Korean text information in youhandojun (KR) part that means a specific content in the operation of query generation and intention analysis and thus may not generate control information for the youhandojun (KR).

Therefore, the electronic apparatus 100 may generate control information in consideration of youhandojun (KR) instead of the title, which is the category information.

The embodiment according to FIG. 9 has described a case where the Korean text information of the youhandojun (KR) is not directly used in the intention analysis operation. If different languages are included in the intention analysis process, the accuracy of the intention analysis may be degraded. Therefore, in FIG. 9, the operation of performing the intention analysis using the category information instead of the Korean text information corresponding to the youhandojun (KR) has been described. In the control information generating operation, the Korean text information of the youhandojun (KR) may be used.

The electronic apparatus 100 according to an embodiment of FIG. 9 performs the intention analysis using information which is composed of one language and thus, accuracy and recognition rate may be improved.

Figure 10:
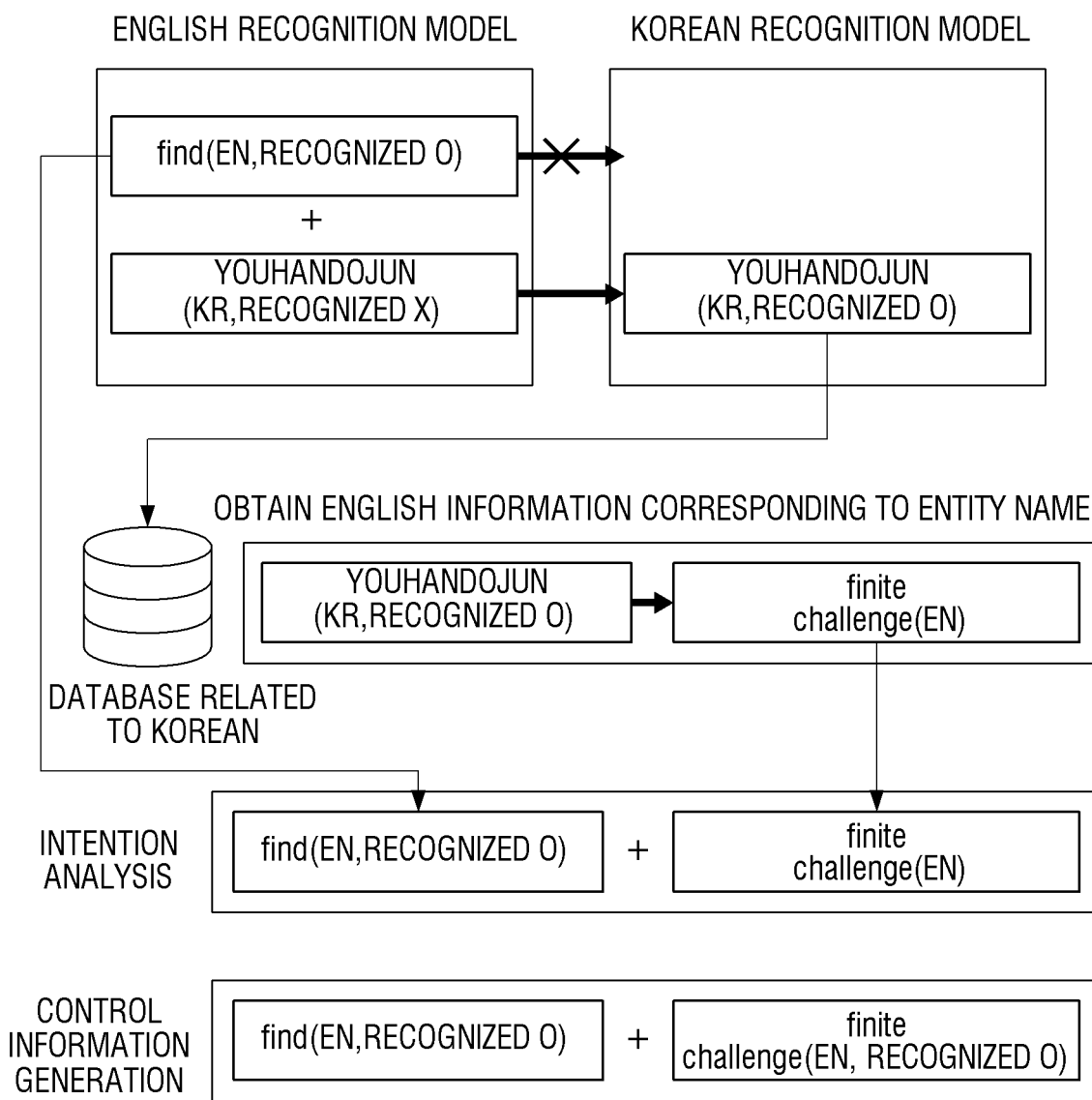
FIG. 10 is a view illustrating an embodiment of intention analysis and generating control information by extracting information corresponding to a specific language.

FIG. 10 is a view illustrating an embodiment of intention analysis and generating control information by extracting information corresponding to a specific language.

In the intention analysis process, if both two languages are used, accuracy and recognition rate may be degraded. Therefore, the electronic apparatus 100 may perform intention analysis using the English text information of the find (EN) and the English text information of youhandojun (KR).

To obtain the English text information of the youhandojun (KR), the electronic apparatus 100 may compare the Korean text information of the youhandojun (KR) to a database associated with the Korean language. For example, the electronic apparatus 100 may search for the Korean text of the youhandojun (KR) included in the database and identify whether English text corresponding to the Korean text is present. When the English text corresponding to the Korean text of youhandojun (KR) is present in the database, the electronic apparatus 100 may obtain the English text information of the youhandojun (KR).

The electronic apparatus 100 may perform the intention analysis using the obtained English text of the youhandojun (KR) and the English text of the find (EN). The electronic apparatus 100 may generate the control information based on the intention analysis result.

The electronic apparatus 100 uses the text information composed of the same language and thus may improve accuracy and recognition rate of the intention analysis.

Figure 11:
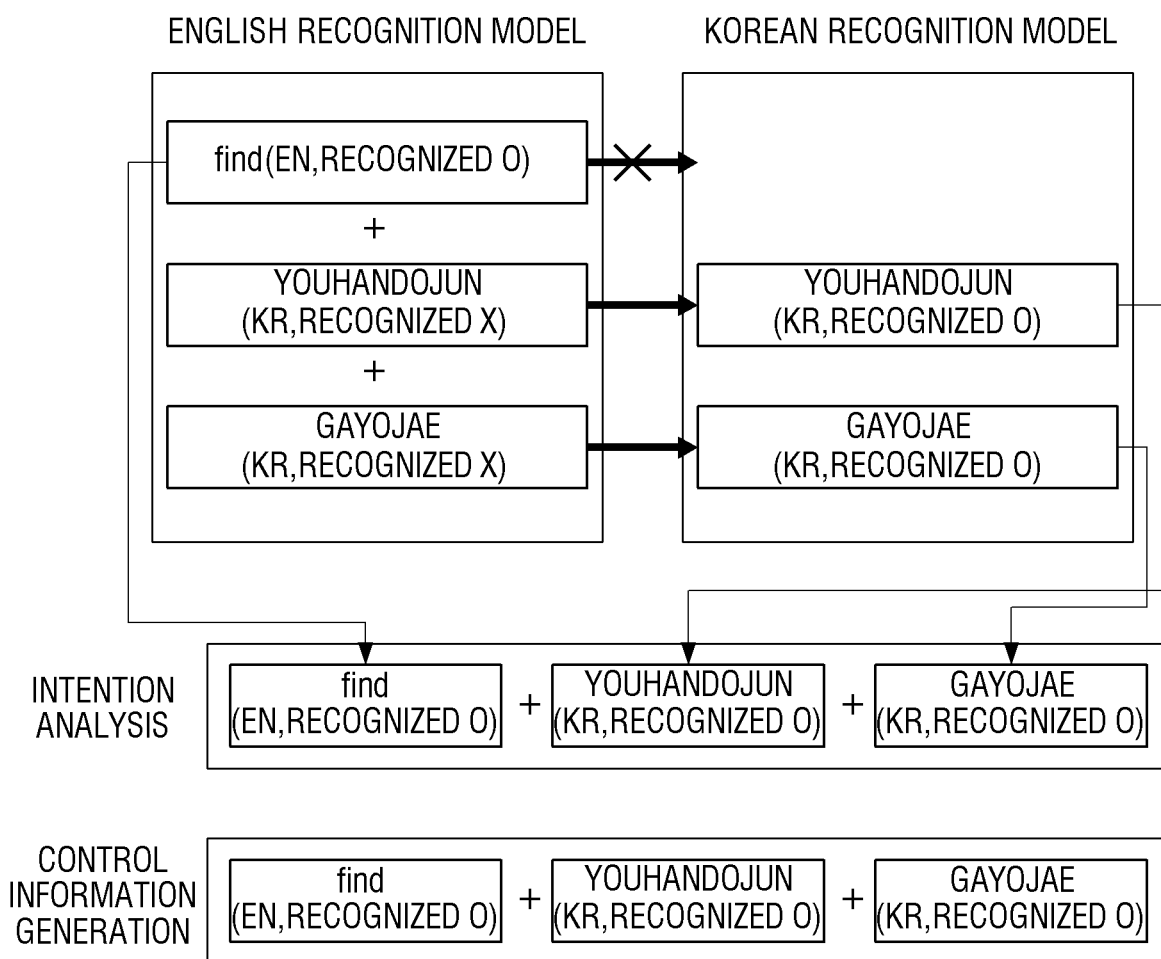
FIG. 11 is a view illustrating a case in which there are two unrecognized segments in the user voice according to an embodiment.

FIG. 11 is a view illustrating a case in which there are two unrecognized segments in the user voice.

In FIG. 11, it is assumed that the user voice is composed of a first segment, a second segment, and a third segment. For example, it is assumed that the user utters "find (EN) youhandojun (KR) gayojae (KR)".

The user voice may include three words, and the electronic apparatus 100 may only recognize find (EN) in the English recognition model. Further, the youhandojun (KR) and gayojae (KR) parts may not be recognized. However, the electronic apparatus 100 may identify that the user voice includes the entity name based on the English text information of find (EN). Then, the electronic apparatus 100 may transmit the unrecognized finite youhandojun (KR) and the gayojae (KR) segment (part) to the Korean recognition model. Using the Korean recognition model, the electronic apparatus 100 may obtain Korean text information for the youhandojun (KR) and the gayojae (KR).

Then, the electronic apparatus 100 may perform an intention analysis operation using both the English text information of find (EN), the Korean text information of the youhandojun (KR), and the Korean text information of the gayojae (KR). The electronic apparatus 100 may generate control information based on the result of the intention analysis operation. As a result, the control information may correspond to a control command reflecting the English text information of find (EN), the Korean text information of the youhandojun (KR), and the Korean text information of the gayojae (KR).

In describing FIG. 11, it has been described that the intention analysis operation uses both the English text information and the Korean text information. However, in actual implementation of FIG. 11, the characteristic according to FIGS. 9 and 10 may be applied.

FIG. 12 is a view illustrating various embodiments in which a user voice is composed of three segments. It is assumed that the segments uttered by the user are named as the first segment, the second segment, and the third segment in a temporal order.

In embodiment 1, it is assumed that the user utters a "Find (EN) youhandojun (KR) gayojae (KR)". Here, the unrecognized segments may be the second segment and the third segment in which the Korean is uttered. Based on the English text information of find (EN), the electronic apparatus 100 may identify that the user voice includes the entity name. The electronic apparatus 100 may perform the intention analysis by recognizing the Korean text information of the gayojae (KR) as a subordinate title or a subtitle.

In embodiment 2, it is assumed that the user utters "find (EN) youhandojun (KR) music festival (EN)". Here, the unrecognized segment may be the second segment in which the Korean is uttered. Based on the English text information of the find (EN), the electronic apparatus 100 may identify that the entity name is included in the user voice. In addition, the electronic apparatus 100 may perform the intention analysis by recognizing the English text information of the music festival (EN) as a subordinate title or subtitle.

In embodiment 3, it is assumed that the user utters "Find (EN) finite challenge (EN) music festival (EN)." The electronic apparatus 100 may perform the voice recognition operation using only the English recognition model since there is no unrecognized segment in the user voice. The electronic apparatus 100 may perform the intention analysis using the English text information directly, without using the Korean recognition model. The electronic apparatus 100 may perform the intention analysis by recognizing the English text information of the music festival (EN) as a subordinate title or a subtitle.

In embodiment 4, it is assumed that the user utters "Play (EN) youhandojun challenge (KR) 5 minute later (EN)." Here, the unrecognized segment may be the second segment in which the Korean is uttered. Based on the English text information of the find (EN), the electronic apparatus 100 may identify that the entity name is included in the user voice. Further, the electronic apparatus 100 may recognize the English text information of the 5 minute later (EN) as time control information to perform an intention analysis.

In embodiment 5, it is assumed that the user utters "Turn (EN) Off (EN) TV (EN)." The electronic apparatus 100 may perform a voice recognition operation using only the English recognition model since there is no unrecognized segment in the user voice. The electronic apparatus 100 may identify that the entity name is not included in the user voice. The electronic apparatus 100 may perform the intention analysis using the English text information directly without using a Korean language recognition model Referring to FIG. 12, the electronic apparatus 100 may analyze the user voice composed of three words and analyze the user voice including two or more entity names. In this case, the electronic apparatus 100 may perform intention analysis by recognizing one entity name and an entity name corresponding to the subordinate entity. When the number of words uttered by the user increases, the accuracy of the intention analysis may be improved. However, if the user's utterance becomes excessively long, the accuracy of the intention analysis may deteriorate and thus, a proper length of user utterance may be required for accurate intention analysis.

Figure 13:
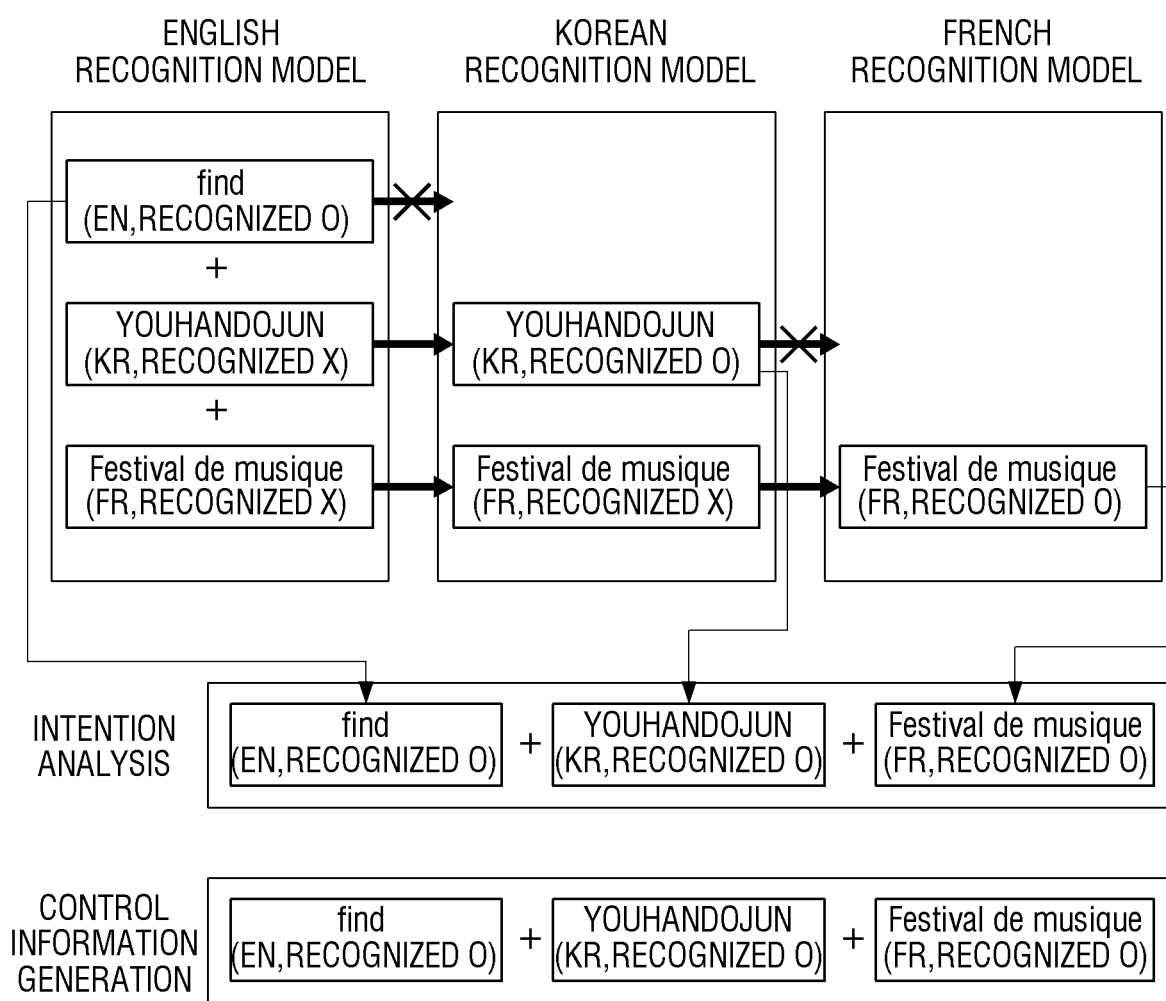
FIG. 13 is a view illustrating an embodiment of performing a voice recognition operation for a user voice composed of three languages.

FIG. 13 is a view illustrating an embodiment of performing a voice recognition operation for a user voice composed of three languages.

In FIG. 3, it is assumed that the user utters "find (EN) youhandojun (KR) Festival de musique (FR)."

The electronic apparatus 100 may obtain the English text information of find (EN) in an English recognition model which is set as a default. The electronic apparatus 100 may identify that the user voice includes the entity name based on the English text information of find (EN). The electronic apparatus 100 may identify that a recognition model in a different language is needed if it is identified that the entity name is included. The electronic apparatus 100 may transmit the unrecognized youhandojun (KR) and the Festival de musique (FR) to the Korean recognition model. The electronic apparatus 100 may obtain the Korean text information of the youhandojun (KR) in the Korean recognition model.

The electronic apparatus 100 may identify whether there is an unrecognized segment in the Korean recognition model as well and may transmit the unrecognized segment to the French recognition model. The electronic apparatus 100 may obtain the French text information of the Festival de musique (FR).

The electronic apparatus 100 may perform the intention analysis operation using the English text information of the find (EN), Korean text information of youhandojun (KR), and French text information of the Festival de musique (FR). The electronic apparatus 100 may generate the control information based on the result of the intention analysis operation. The control information may correspond to the control command to which the English text information of the find (EN), Korean text information of youhandojun (KR), and French text information of Festival de musique (FR) are reflected.

Here, the order of using the English recognition model, Korean recognition model, and the French recognition model is not necessarily applied to implementation of the electronic apparatus 100. The order may be changed by user setting.

In FIG. 13, it has been described that the intention analysis operation uses the English text information, Korean text information, and the French text information at the same time. However, in implementation of FIG. 13, the feature of FIGS. 9 and 10 may be applied.

Figure 14:
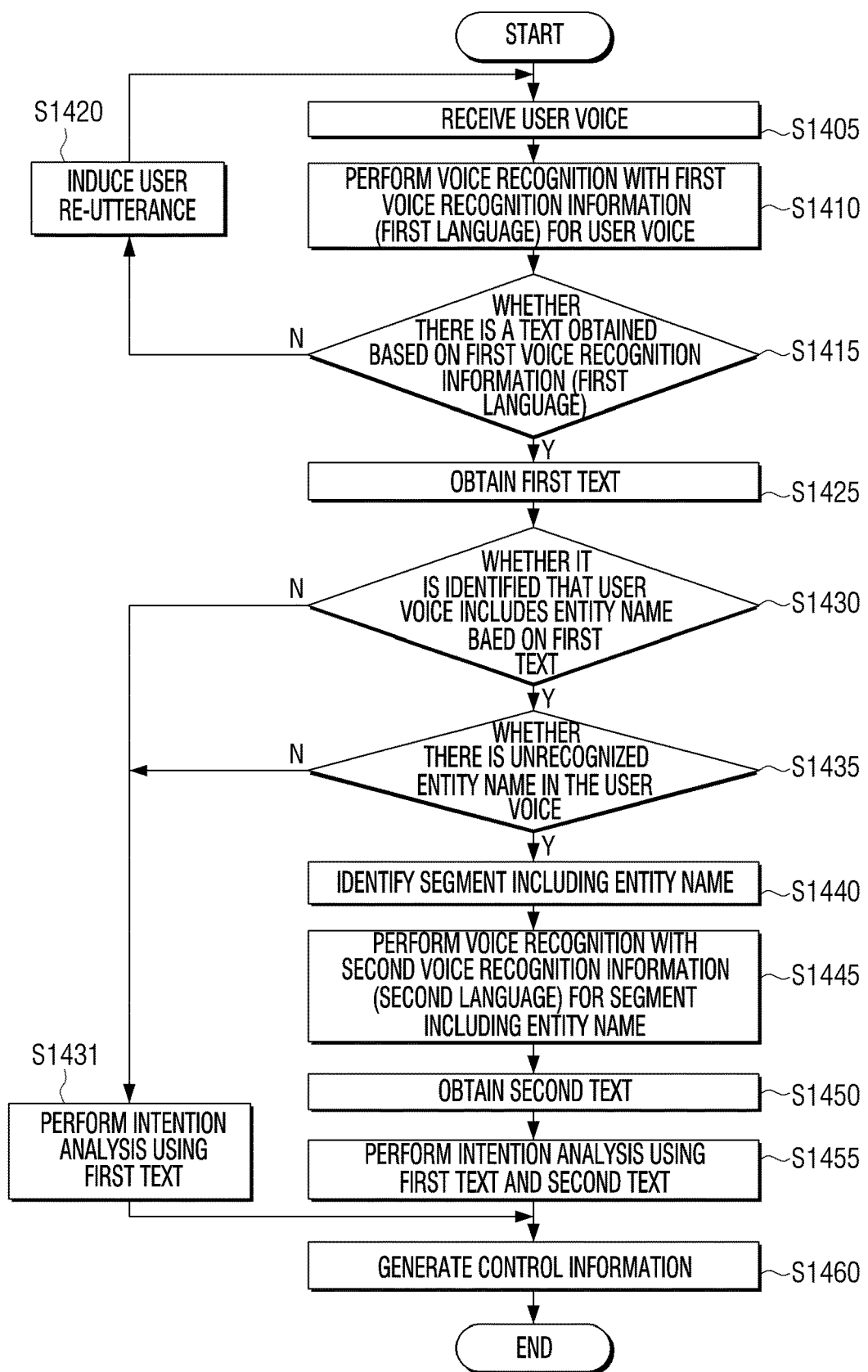
FIG. 14 is a flowchart illustrating a voice recognition process according to an embodiment.

FIG. 14 is a flowchart illustrating a voice recognition process according to an embodiment.

Referring to FIG. 14, the electronic apparatus 100 may receive a user voice in operation S1405. In addition, the electronic apparatus 100 may perform a voice recognition operation using the first voice recognition information (first language) for the received user voice in operation S1410. In addition, the electronic apparatus 100 may identify whether there is text information that is obtained as a result of the voice recognition operation using the first voice recognition information (first language) in operation S1415. Here, if the voice recognition result using the first voice recognition information (first language) is not obtained at all, the electronic apparatus 100 may induce the user's reutterance in operation S1420. For example, if the user's uttered voice does not include the first language, the electronic apparatus 100 may not obtain the text information based on the first voice recognition information (first language). In this case, the electronic apparatus 100 may not confirm the user voice and the intention of the user at all, and may display a UI requesting reutterance, or output a voice to induce reutterance.

The electronic apparatus 100 may obtain the first text by the voice recognition result using the first voice recognition information (first language) in operation S1425. Here, the first text may correspond to the first language. The electronic apparatus 100 may identify whether it is identified that the user voice includes the entity name based on the first text in operation S1430. Here, the entity name may refer to a name of an object associated with the content.

When it is not identified that the user voice includes the entity name, the electronic apparatus 100 may perform the intention analysis operation using only the first text in operation S1431.

In operation S1430, if it is identified that the user voice includes the entity name, the electronic apparatus 100 may identify whether the user voice includes an unrecognized entity name in operation S1435.

In operation S1435, if it is identified that the user voice has no unrecognized part, the electronic apparatus 100 may perform the intention analysis using the first text in operation S1431. If there is no unrecognized part in the user voice, the electronic apparatus 100 may consider that the user voice is analyzed all, with only the first voice recognition information (first language). Accordingly, the intention analysis operation may be performed directly with only the first text, regardless of the second voice recognition information (second language).

In operation S1435, if it is identified that there is an unrecognized part of the user voice, the electronic apparatus 100 may identify a segment in which the entity name is included in the unrecognized part in operation S1440. For example, the electronic apparatus 100 may identify the unrecognized part of the user voice as a segment including the entity name. If it is assumed that the user utters "find (EN) youhandojun (KR)" and the electronic apparatus 100 assumes that English is set as the voice recognition language. The find (EN) part corresponds to the first segment and is in English and thus, may be obtained as the first text information by the first voice recognition information (first language). However, youhandojun (KR) corresponds to the second segment and is in Korean and thus, may not be recognized by the English recognition model. The electronic apparatus 100 may identify the youhandojun (KR) part as an unrecognized part. The electronic apparatus 100 may identify the youhandojun (KR) as a segment including the entity name.

Following operation S1440, the electronic apparatus 100 may perform the voice recognition operation using the second voice recognition information (second language) for the segment (for example, youhandojun (KR) part) which is supposed to include the entity name.

When the user voice corresponding to the unrecognized part is recognized by the second voice recognition information (second language), the electronic apparatus 100 may obtain the second text in operation S1450. For example, when the second voice recognition information (second language) is Korean, the electronic apparatus 100 may obtain the second text information for youhandojun (KR).

The electronic apparatus 100 may perform the intention analysis operation using the first text information and the second text information in operation S1455. The electronic apparatus 100, based on the intention analysis operation result obtained by the operation S1455, may generate the control information in operation S1460. The electronic apparatus 100 may perform a control operation using the generated control information. For example, by the utterance operation for "find (EN) youhandojun (KR)", the intention analysis operation and control operation may be generated, and the electronic apparatus 100 may perform an operation to search for a content named "youhandojun."

Figure 15:
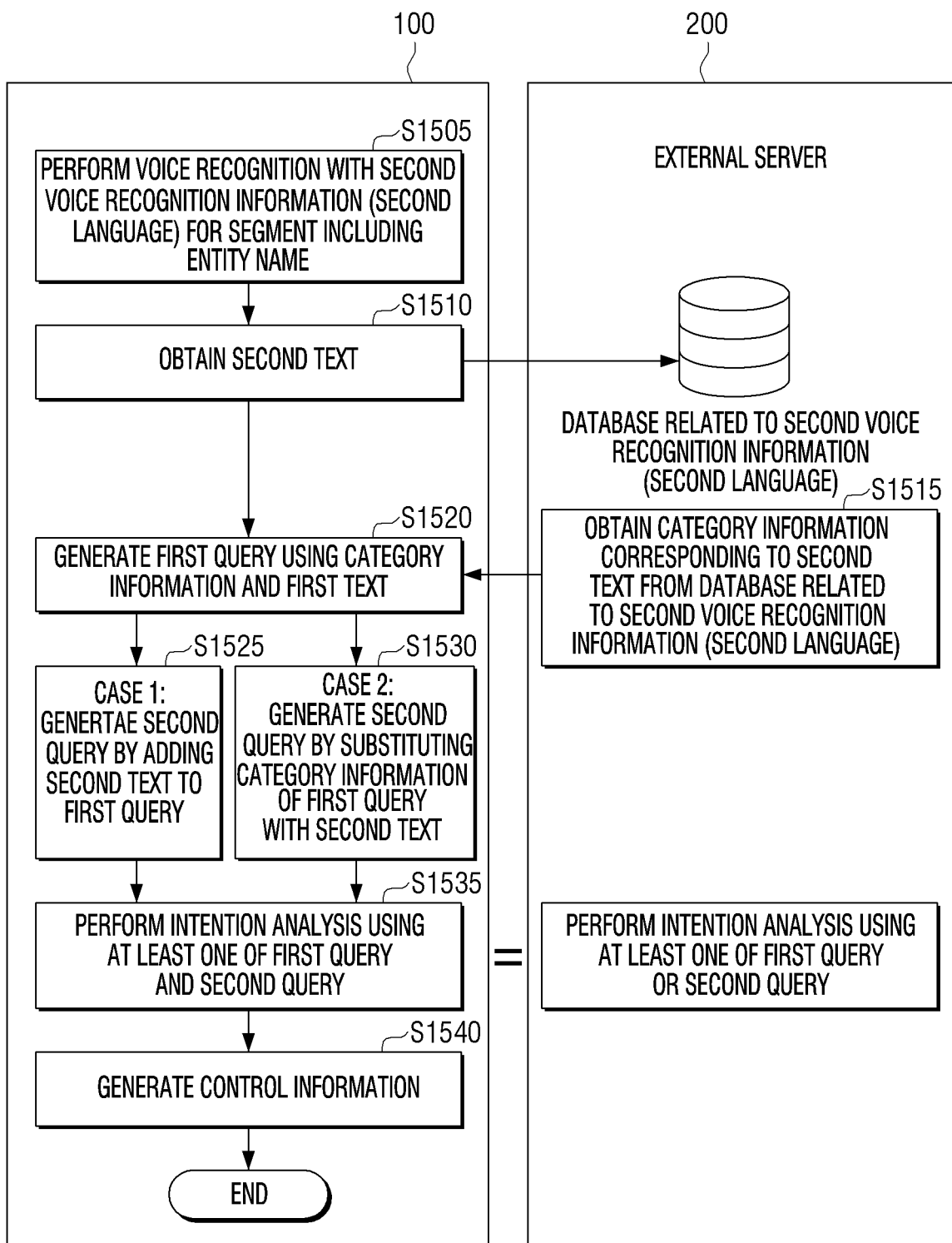
FIG. 15 is a flowchart illustrating a voice recognition process according to an embodiment.

FIG. 15 is a flowchart illustrating a voice recognition process according to still another embodiment. To be specific, FIG. 15 is a view to describe a voice recognition process of realizing an operation subsequent to S1445 and S1450 according to still another embodiment.

The electronic apparatus 100 may perform a voice recognition operation for the segment which is identified to include the entity name in the user voice using the second voice recognition information (second language) in operation S1505. When the user voice corresponding to the segment including the entity name corresponds to the second voice recognition information (second language), the electronic apparatus 100 may obtain the second text in operation S1510.

The electronic apparatus 100 may transmit the obtained second text information to an external server 200. The external server 200 may compare the database related to the second voice recognition information (second language) with the received second text. Specifically, in the external server 200, the database related to the second voice recognition information (second language) may be searched, and the category information corresponding to the received second text information may be obtained from the database in operation S1515. The external server 200 may transmit the obtained category information to the electronic apparatus 100.

The electronic apparatus 100 may receive the category information corresponding to the second text information received from the external server 200. The first query may be generate using the category information corresponding to the second text information and the first text information in operation S1520.

The electronic apparatus 100 may generate the second query by adding the second text information to the first query in operation S1525. By adding the second text information to the first query which is generated by using only category information, a new second query may be generated.

The electronic apparatus 100 may generate the second query by substituting the category information of the first query with the second text information. The electronic apparatus 100 may generate the second query by deleting the category information from the first query and adding the second text information.

In the meantime, the operation of S1525 or S1530 may be made selectively. That is, the second query may be generated using at least one method according to the user setting.

The electronic apparatus 100 may perform the intention analysis operation using at least one of the first query and second query in operation S1535. According to still another embodiment, operation S1535 may be performed in the external server 200, not the electronic apparatus 100.

Based on the intention analysis result performed by operation S1535, the electronic apparatus 100 may generate the control information in operation S1540. The electronic apparatus 100 may perform an operation corresponding to the user voice based on the generated control information. According to still another embodiment, the electronic apparatus 100 may generate a control command to perform an operation corresponding to the user voice.

In FIG. 15, the operation of the electronic apparatus and the external device has been distinguished, but all the operations may be performed by the electronic apparatus 100 only.

Figure 16:
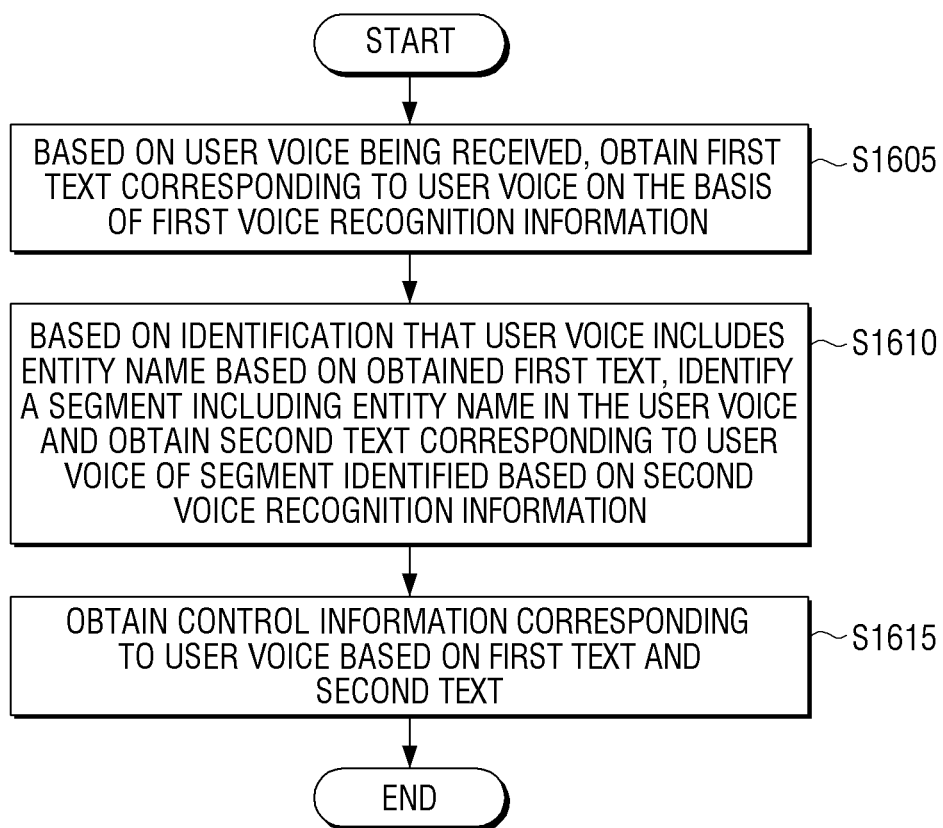
FIG. 16 is a flowchart illustrating a controlling method of an electronic apparatus according to an embodiment.

FIG. 16 is a flowchart illustrating a controlling method of an electronic apparatus according to an embodiment.

Referring to FIG. 16, a controlling method of an electronic apparatus storing the first voice recognition information related to the first language and the second voice recognition information related to the second language may obtain the first text corresponding to the user voice received based on the first voice recognition information in operation S1605.

The controlling method, when it is identified that the user voice includes the entity name based on the obtained first text, may identify the segment including the entity name in the user voice and obtain the second text corresponding to the user voice of the segment that is identified based on the second voice recognition information in operation S1610.

The controlling method may obtain the control information corresponding to the user voice based on the first text and the second text in operation S1615.

Here, the operation of obtaining the second text in operation S1610 may, if it is identified that the entity name that is not recognized based on the first voice recognition information is included in the user voice, identify the segment including the unrecognized segment name in the user voice.

Here, the operation of obtaining the second text in operation S1610, if a predetermined word is included in the obtained first text, may identify that the entity name is included in the user voice.

The entity name may be related to a content, and the predetermined word may be related to control information for performing a content search.

The first voice recognition information is information corresponding to a language mode that is set to the electronic apparatus and the operation of obtaining the second text in operation S1610 may, when a segment including the entity name that is not recognized in the user voice is identified, obtain the second text corresponding to the user voice of the segment identified based on the second voice recognition information corresponding to a language mode that is different from the language mode that is currently set.

The operation of obtaining the second text in operation S1610 may identify a segment including a predetermined word in a user voice and identify a segment other than the identified segment in the user voice as a segment including an entity name.

The controlling method may generate the first query corresponding to the category information. The first query is generated based on the category information corresponding to the second text and the first text.

The controlling method may generate the second query by adding the second text to the generated first query or substituting the category information with the second text.

The generating the first query may, when the plurality of second texts are obtained from the user voice of the segment identified based on the second voice recognition information, obtain category information corresponding to each of the plurality of second texts and generate the first query based on the obtained category information.

The generating the first query may obtain the category information corresponding to the second text based on the database related to the second voice recognition information.

The methods according to various embodiments as described above may be implemented as an application format which may be installed in a related-art electronic apparatus.

The methods according to various embodiments as described above may be implemented by software upgrade or hardware upgrade for the related-art electronic apparatus.

The various embodiments as described above may be performed through an embedded server provided in the electronic apparatus 100 or an external server of the electronic apparatus 100.

The controlling method of the electronic apparatus 100 according to an embodiment may be implemented as a program and provided to the electronic apparatus 100. In particular, a program including a controlling method of the electronic apparatus 100 may be stored in a non-transitory computer readable medium and provided.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided The foregoing embodiments and advantages are merely exemplary and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic apparatus comprising:
a display;
a voice receiver configured to receive a user voice input; and
a processor configured to:
    obtain a first text from the user voice input that is received through the voice receiver by performing a voice recognition based on a first language,
    obtain a predetermined word from the first text based on the first language,
    in response to an entity name being unrecognizable in the first text by performing the voice recognition based on the first language, obtain the entity name by performing a voice recognition based on a second language, and
    control the display to display a voice recognition result corresponding to the user voice input based on the predetermined word and the entity name.

2. The electronic apparatus of claim 1,
wherein the processor is configured to:
    in response to the entity name being unrecognizable by performing the voice recognition based on the first language, identify a segment in the user voice input in which the entity name is included, and
    obtain a second text based on the segment.

3. The electronic apparatus of claim 2,
wherein the processor is configured to, based on a predetermined word being included in the obtained first text, identify that the user voice input includes the entity name.

4. The electronic apparatus of claim 3,
wherein the predetermined word is related to control information for performing a search in association with a content, and
wherein the entity name is related to a content which is a subject corresponding to an search operation.

5. The electronic apparatus of claim 2,
wherein the voice recognition based on the first language corresponds to a language mode of the first language that is currently set to the electronic apparatus, and
wherein the processor is configured to:
in response to the voice recognition based on the second language corresponding to a language mode of the second language different from the language mode of the first language that is currently set, obtain the second text corresponding to the identified segment in the user voice input in which the unrecognizable entity name is included.

6. The electronic apparatus of claim 3,
wherein the processor is configured to:
identify a portion of the segment that includes the predetermined word in the user voice input and identify a remaining portion of the segment except the identified portion of the segment in the user voice input as the segment in the user voice input in which the entity name is included.

7. The electronic apparatus of claim 1,
wherein the processor is configured to, based on category information corresponding to a second text, and the first text, generate a first query corresponding to the category information.

8. The electronic apparatus of claim 7,
wherein the processor is configured to generate a second query by adding the second text to the generated first query or substituting the category information with the second text.

9. The electronic apparatus of claim 7,
wherein the processor is configured to, in response to a plurality of second texts being obtained from the user voice input of a segment identified according to the voice recognition based on the second language, obtain category information corresponding to each of the plurality of second texts and generate the first query based on the obtained category information.

10. The electronic apparatus of claim 7,
wherein the processor is configured to obtain the category information corresponding to the second text based on a database related to the voice recognition based on the second language.

11. A controlling method of an electronic apparatus, the controlling method comprising:
obtaining a first text from a user voice input that is received by performing a voice recognition based on a first language;
obtaining a predetermined word from the first text based on the first language;
in response to an entity name being unrecognizable in the first text by performing the voice recognition based on the first language, obtaining the entity name by performing a voice recognition based on a second language; and
displaying a voice recognition result corresponding to the user voice input based on the predetermined word and the entity name.

12. The controlling method of the electronic apparatus of claim 11,
wherein a second text is obtained, and the obtaining of the second text comprises:
in response to the entity name being unrecognizable performing the voice recognition based on the first language, identifying a segment in the user voice input in which the entity name is included, and obtaining the second text based on the segment.

13. The controlling method of the electronic apparatus of claim 12,
wherein the obtaining of the second text comprises:
based on a predetermined word being included in the obtained first text, identifying that the user voice input includes the entity name.

14. The controlling method of the electronic apparatus of claim 13,
wherein the predetermined word is related to control information for performing a search in association with a content, and
wherein the entity name is related to a content which is a subject corresponding to a search operation.

15. The controlling method of the electronic apparatus of claim 12,
wherein the voice recognition based on the first language corresponds to a language mode of the first language that is currently set to the electronic apparatus, and
wherein the obtaining of the second text comprises:
in response to the voice recognition based on the second language corresponding to a language mode of the second language different from the language mode of the first language that is currently set, obtaining the second text corresponding to the identified segment in the user voice input in which the unrecognizable entity name is included.

16. The controlling method of the electronic apparatus of claim 13,
wherein the obtaining of the second text comprises:
identifying a portion of the segment that includes the predetermined word in the user voice input and identifying a remaining portion of the segment except the identified portion of the segment in the user voice input as the segment in the user voice input in which the entity name is included.

17. The controlling method of the electronic apparatus of claim 11,
wherein the controlling method further comprises:
based on category information corresponding to a second text, and the first text, generating a first query corresponding to the category information.

18. The controlling method of the electronic apparatus of claim 17,
wherein the controlling method further comprises:
generating a second query by adding the second text to the generated first query or substituting the category information with the second text.

19. The controlling method of the electronic apparatus of claim 17,
wherein the generating the query comprises:
in response to a plurality of second texts being obtained from the user voice input of a segment identified according to the voice recognition based on the second language, obtaining category information corresponding to each of the plurality of second texts and generating the first query based on the obtained category information.

20. The controlling method of the electronic apparatus of claim 17,
wherein the controlling method further comprises:
obtaining the category information corresponding to the second text based on a database related to the voice recognition based on the second language.

* * * * *